United States Patent
Kim

(10) Patent No.: US 10,460,243 B2
(45) Date of Patent: Oct. 29, 2019

(54) NETWORK DEVICE PREDICTIVE MODELING

(71) Applicant: Belkin International, Inc., Playa Vista, CA (US)

(72) Inventor: Ryan Yong Kim, Rolling Hills Estates, CA (US)

(73) Assignee: Belkin International, Inc., Playa Vista, CA (US)

( * ) Notice: Subject to any disclaimer, the term of this patent is extended or adjusted under 35 U.S.C. 154(b) by 1113 days.

(21) Appl. No.: 14/670,285

(22) Filed: Mar. 26, 2015

(65) Prior Publication Data

US 2016/0171374 A1    Jun. 16, 2016

Related U.S. Application Data

(63) Continuation of application No. 14/668,828, filed on Mar. 25, 2015.
(Continued)

(51) Int. Cl.
| | |
|---|---|
| *G06N 5/02* | (2006.01) |
| *G06N 5/04* | (2006.01) |
| *G05B 15/02* | (2006.01) |
| *H04L 12/26* | (2006.01) |
| *H04L 29/08* | (2006.01) |

(52) U.S. Cl.
CPC ............. *G06N 5/022* (2013.01); *G05B 15/02* (2013.01); *G06N 5/04* (2013.01); *H04L 43/16* (2013.01); *H04L 67/10* (2013.01)

(58) Field of Classification Search
None
See application file for complete search history.

(56) References Cited

U.S. PATENT DOCUMENTS

| | | |
|---|---|---|
| 8,484,190 B1 | 7/2013 | Igarashi et al. |
| 2006/0203295 A1 | 9/2006 | D'Silva et al. |

(Continued)

FOREIGN PATENT DOCUMENTS

| | | |
|---|---|---|
| WO | 2011037329 A2 | 3/2011 |
| WO | 2013043863 A1 | 3/2013 |

OTHER PUBLICATIONS

Notice of Allowance dated Nov. 27, 2015 for U.S. Appl. No. 14/668,828; 8 pages.
(Continued)

*Primary Examiner* — Kakali Chaki
*Assistant Examiner* — Michael Zidanic
(74) *Attorney, Agent, or Firm* — Kilpatrick Townsend & Stockton LLP

(57) ABSTRACT

Techniques and systems are provided for predictive modeling based on interactions with a network device. For example, a method may include generating a prediction including a correlation between an interaction with a network device and a context, wherein the interaction is associated with a function performed by the network device. Confidence parameters associated with the prediction can be determined. The prediction can be tested by analyzing received interaction data and contextual data, and the analysis can include determining whether the interaction with the network device occurred in the correlated context. A confidence value can be calculated based on the testing outcome, and can be compared to the confidence parameters. A message relating to modification of the confidence parameters can be transmitted.

27 Claims, 18 Drawing Sheets

Related U.S. Application Data

(60) Provisional application No. 62/090,344, filed on Dec. 10, 2014, provisional application No. 62/091,458, filed on Dec. 12, 2014.

(56) References Cited

U.S. PATENT DOCUMENTS

| | | |
|---|---|---|
| 2010/0082640 A1 | 4/2010 | Wexler et al. |
| 2011/0046805 A1 | 2/2011 | Bedros et al. |
| 2012/0296909 A1 | 11/2012 | Cao et al. |
| 2013/0132566 A1 | 5/2013 | Olsen et al. |
| 2013/0339283 A1 | 12/2013 | Grieves et al. |

OTHER PUBLICATIONS

PCT/US2015/063687, "International Preliminary Report on Patentability", dated Jun. 22, 2017, 11 pages.
PCT/US2015/063687, "International Search Report and Written Opinion", dated Jun. 29, 2016, 18 pages.

NETWORK DEVICE PREDICTIVE MODELING

CROSS REFERENCE TO RELATED APPLICATIONS

This application is a continuation of U.S. patent application Ser. No. 14/668,828 filed on Mar. 25, 2015, and claims the benefit under 35 U.S.C. § 119(e) to U.S. Provisional Patent Application No. 62/090,344 filed on Dec. 10, 2014 and to U.S. Provisional Patent Application No. 62/091,458 filed on Dec. 12, 2014, the contents of which are incorporated by reference herein in their entirety for all purposes.

TECHNICAL FIELD

The present disclosure relates to network devices. Specifically, various techniques and systems are provided for predictive modeling based on interactions with a network device.

BACKGROUND

Residences, offices, and other locations may have electronic devices (e.g., lamps, fans, heaters, televisions, motion sensors, etc.). Some electronic devices may be operated within a network environment. For example, an automation network may allow a user to schedule or otherwise automate functionalities of various electronic devices (e.g., network devices) connected to the network. Automation networks generally operate only in accordance with rules and settings manually provided by users. Without knowledge of a user's intentions and needs, providing such rules and settings by way of an automated process may be impossible. Moreover, predicting and executing rules and settings automatically may be undesirable to users that are uncomfortable with network device operations being performed automatically without their input being provided.

BRIEF SUMMARY

Techniques are described for predictive modeling based on interactions with a network device. In some embodiments, a computer-implemented method may be provided. The method may include receiving, at a computing device, interaction data corresponding to a set of interactions. The interactions can be associated with functions performed by a network device. Contextual data corresponding to a set of contexts can be received from a source other than the source of the interaction data. The received interaction data and contextual data can be analyzed. The analysis can include identifying a correlation between a context in the received contextual data and an interaction associated with a function performed by the network device. A prediction can be generated using the identified correlation. Interaction data corresponding to a new set of interactions and contextual data corresponding to a new set of contexts can be received. The new set of contexts can include the context correlated with the interaction associated with the function performed by the network device. The prediction can be tested, and the testing can include determining whether the network device performed the function when the correlated context occurred. Contextual data corresponding to a present set of contexts can be received. The present set of contexts can include the context correlated with the interaction associated with the function performed by the network device. A message can be transmitted, the message including an automation request corresponding to the function performed by the network device.

In other embodiments, a system may be provided. The system can include one or more data processors and a non-transitory computer-readable storage medium containing instructions which when executed on the one or more data processors, cause the one or more data processors to perform operations. The operations can include receiving interaction data corresponding to a set of interactions. The interactions can be associated with functions performed by a network device. Contextual data corresponding to a set of contexts can be received from a source other than the source of the interaction data. The received interaction data and contextual data can be analyzed. The analysis can include identifying a correlation between a context in the received contextual data and an interaction associated with a function performed by the network device. A prediction can be generated using the identified correlation. Interaction data corresponding to a new set of interactions and contextual data corresponding to a new set of contexts can be received. The new set of contexts can include the context correlated with the interaction associated with the function performed by the network device. The prediction can be tested, and the testing can include determining whether the network device performed the function when the correlated context occurred. Contextual data corresponding to a present set of contexts can be received. The present set of contexts can include the context correlated with the interaction associated with the function performed by the network device. A message can be transmitted, the message including an automation request corresponding to the function performed by the network device.

In other embodiments, a computer-program product can be provided. The computer-program product can be tangibly embodied in a non-transitory machine-readable storage medium, and can include instructions configured to cause a data processing apparatus to receive interaction data corresponding to a set of interactions. The interactions can be associated with functions performed by a network device. Contextual data corresponding to a set of contexts can be received from a source other than the source of the interaction data. The received interaction data and contextual data can be analyzed. The analysis can include identifying a correlation between a context in the received contextual data and an interaction associated with a function performed by the network device. A prediction can be generated using the identified correlation. Interaction data corresponding to a new set of interactions and contextual data corresponding to a new set of contexts can be received. The new set of contexts can include the context correlated with the interaction associated with the function performed by the network device. The prediction can be tested, and the testing can include determining whether the network device performed the function when the correlated context occurred. Contextual data corresponding to a present set of contexts can be received. The present set of contexts can include the context correlated with the interaction associated with the function performed by the network device. A message can be transmitted, the message including an automation request corresponding to the function performed by the network device.

In other embodiments, a computer-implemented method can be provided. The method may include generating, at a computing device, a prediction including a correlation between an interaction with a network device and a context, wherein the interaction is associated with a function performed by the network device. Confidence parameters associated with the prediction can be determined. The prediction can be tested, wherein testing includes analyzing received interaction data and contextual data, and wherein analyzing includes determining whether the interaction with the network device occurred in the correlated context. A confidence value can be calculated based on the testing outcome, and the confidence value can be compared to the confidence parameters. A message can be transmitted, wherein the message relates to a modification of the confidence parameters.

In other embodiments, a system can be provided. The system can include one or more data processors and a non-transitory computer-readable storage medium containing instructions which when executed on the one or more data processors, cause the one or more data processors to perform operations. The operations can include generating a prediction including a correlation between an interaction with a network device and a context, wherein the interaction is associated with a function performed by the network device. Confidence parameters associated with the prediction can be determined. The prediction can be tested, wherein testing includes analyzing received interaction data and contextual data, and wherein analyzing includes determining whether the interaction with the network device occurred in the correlated context. A confidence value can be calculated based on the testing outcome, and the confidence value can be compared to the confidence parameters. A message can be transmitted, wherein the message relates to a modification of the confidence parameters.

In other embodiments, a computer-program product can be provided. The computer-program product can be tangibly embodied in a non-transitory machine-readable storage medium, and can include instructions configured to cause a data processing apparatus to generate a prediction including a correlation between an interaction with a network device and a context, wherein the interaction is associated with a function performed by the network device. Confidence parameters associated with the prediction can be determined. The prediction can be tested, wherein testing includes analyzing received interaction data and contextual data, and wherein analyzing includes determining whether the interaction with the network device occurred in the correlated context. A confidence value can be calculated based on the testing outcome, and the confidence value can be compared to the confidence parameters. A message can be transmitted, wherein the message relates to a modification of the confidence parameters.

BRIEF DESCRIPTION OF THE DRAWINGS

Illustrative embodiments of the present invention are described in detail below with reference to the following drawing figures.

DETAILED DESCRIPTION

Figure 1:
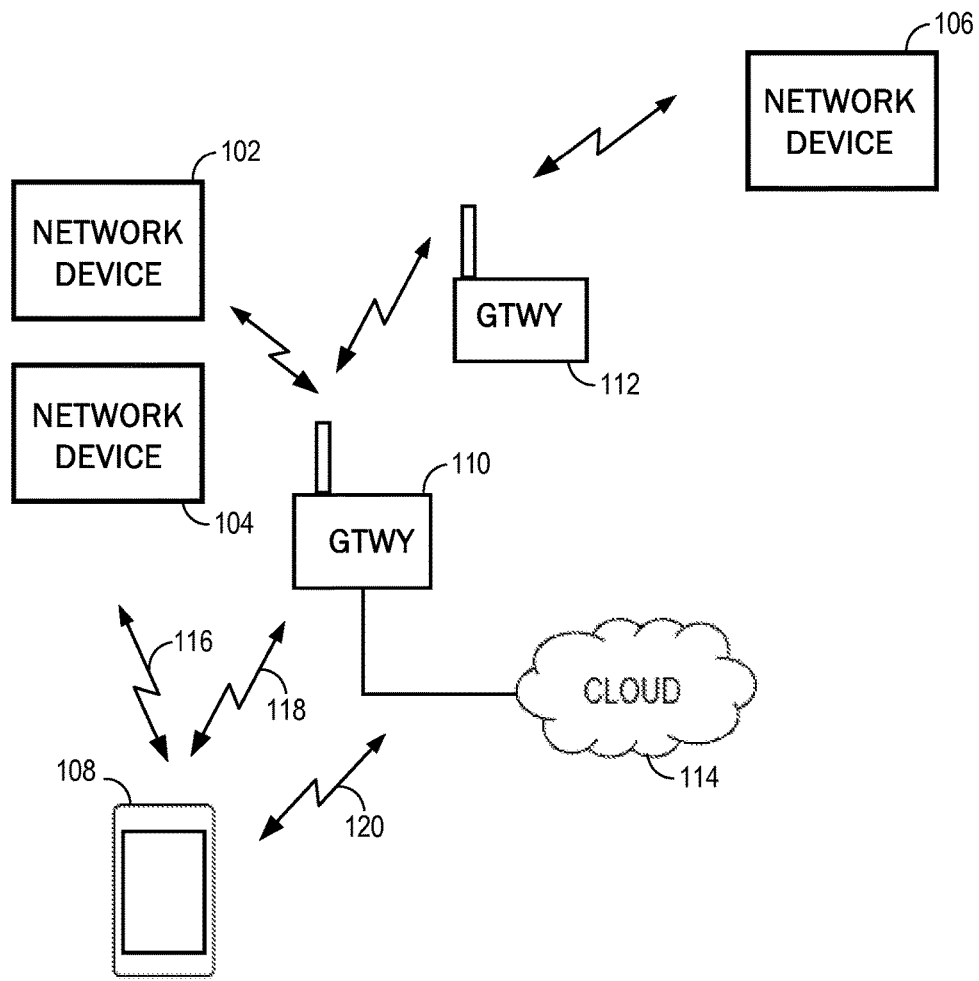
FIG. 1 shows an example wireless network environment, in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory, or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide a user with access to various devices within the network. For example, a network may include one or more network devices that provide a user with the ability to remotely configure or control one or more electronic devices (e.g., appliances) within an environment that can support the network. For example, an environment can include a home, an office, a business, an automobile, or the like. A network may include one or more gateways that provide the user with access to the network devices using a client device. A client device can include an access device such as a mobile phone, laptop computer, desktop computer, and the like. The one or more gateways may also provide the user and the network devices with access to one or more external networks, such as a cloud network, the Internet, and/or other wide area networks.

A local area network, such as a user's home local area network, can include multiple network devices that provide various functionalities. Network devices may be accessed and controlled using an access device and/or network gateways. The local area network can also extend outside the user's home and include network devices located outside the user's home. For instance, the local area network can include network devices such as exterior motion sensors, exterior lighting (i.e., porch lights, walkway lights, security lights, and the like), garage door openers, sprinkler systems, and other network devices that are exterior to the user's dwelling. It may be desirable for a user to be able to access the network devices while located within the local area network and also while located remotely from the local area network. For example, a user may access the network devices using an access device within the local area network or remotely from the local area network. The access device may allow the user to control attributes related to operation of those network devices regardless of whether the computing device is located within the local area network and is located remotely from the local area network.

In some embodiments, a computing device may initially determine the devices that are connected to a network. The determination may be made based on whether the computing device located within the wireless network of the devices or located remote from the wireless network. The computing device may have access to the wireless network based on its authentication with a logical network which enables access to the wireless network. In some embodiments, the computing device may perform local network discovery while within the wireless network to identify the devices connected to the network. Upon determining that the computing device is not located within the network, the computing device can determine the devices on the network by communicating with a cloud network to obtain information about devices on the network. The cloud network can store a status of devices on the network. The computing device can also determine devices on the network by accessing a local cache that can contain information it has previously received about devices known to exist on the network. The computing device can determine a status of the devices based on its local cache, information received from the cloud, or by direct communication with the devices within the local network. The computing device can access status information from the local cache to present in a display to a user.

In some embodiments, the computing device can execute an application that can cause the computing device to present the graphical interface containing information (e.g., status) about devices discovered in the network. The graphical interface can present a visual interface for each device accessible on the network. In some embodiments, the visual interface corresponding to a device can be rendered as a modular tile with one or more interactive elements or one or more interactive areas to control operation of the device. The visual interface corresponding to a device can provide a status of the device. These basic properties can include, for example, a default icon, a default name, interactive elements, and/or interactive areas for controlling one or more functionalities of a device. The functionalities can include, for example, powering the network device on and off. The functionalities can enable adjustment of adjustable attributes and/or settings for a device. For example, a device can be a light bulb, for which attributes or settings can be controlled via the tile.

In certain embodiments, the status or state of a device can be indicated in the graphical interface, such as within the tile, with text and/or graphically. The status of the device can change based on time (e.g., a period, an interval, or other time schedule). The status of a device may be any piece of information pertinent to that particular device. The status of a device may be any adjustable of changeable variable, attribute, or setting related to operation of that particular device. For example, the status of a device may include a state of the device itself (e.g., on or off). In certain embodiments, the status can include a value or other criteria for a setting or an attribute related to operation of a device. The setting or the attribute can be within a range of values. For example, the device can be a light bulb and the status can include a value corresponding to an amount of brightness (e.g., a percentage of total brightness) emitted by the light bulb when the light bulb is powered-on.

In certain embodiments, the tile or an interactive element in the tile, or an interactive area in the graphical interface or the tile, can enable interaction to dynamically adjust one or more settings and/or attributes related to operation of a device corresponding to the tile. In some embodiments, a status of the tile may be dynamically displayed in the tile in response to the interaction. All or some of an appearance of the tile, an image in the tile, or an interactive element can be modified to indicate a new state or a change in the setting or the attribute of the device. In some embodiments, an appearance of the tile, an image in the tile, or an interactive element can be modified corresponding to a gradual change in a state or an attribute/setting of the device until a desired state or value of an attribute/setting is reached. For example, a light bulb shown in the tile may be modified to include an animation, color, sound, information, etc. to indicate a change in the setting. In some embodiments, the light bulb may be displayed as being filled, dimmed, or brightened by an amount corresponding to the adjusted setting (e.g., brightness). In some embodiments, interaction with the graphical interface (e.g., a motion or a swipe of a finger on a display) can cause adjustment to be made for an attribute related to operation of the device.

In some embodiments, the tile can include or cause additional visual interfaces (e.g., menus or drawers) to be displayed within the graphical interface. The visual interfaces can enable control of settings and/or attributes related to operation of a device (or multiple devices in a group) corresponding to the tile. For example, a tile can include a drawer that displays options for secondary functionalities in response to a selection made for a primary functionality (e.g., controlling a power state) for a device. In certain embodiments, the drawer can display secondary settings, including a default, implied secondary setting for a device, wherein the implied secondary setting is tied to a setting selected for a primary function. The secondary settings can affect the operation of the device and can be related to scheduling operation of the device (i.e., setting on/off times), selecting auto off timeouts or thresholds, selecting settings for putting the device into a standby, hibernate, or sleep mode, and/or controlling adjustable features (e.g., lighting or speed). By enabling a user to control features and secondary settings of a device, a user is enabled with the ability to remotely control multiple features for several devices without being present at a location of those devices.

In certain embodiments, an updated status including the adjustment of a setting can be transmitted to the wireless network that includes the device being adjusted. In the case when the computing device and the device affected by the adjustment are within the wireless network, the updated status can be received directly from the computing device. Upon determining that the computing device is remote (e.g., not located within the network), the updated status can be transmitted to the cloud network. The cloud network can then store the updated status and communicate the updated status to the device.

In some embodiments, the graphical interface can be modified to indicate a change to a setting or an attribute (e.g., a desired setting) based on an adjustment from interaction with the interactive area. For example, a status of the tile may be dynamically displayed in the tile in response to the interaction. All or some of an appearance of the tile, an image in the tile, or an interactive element can be modified to indicate a new state or a change in the setting or the attribute of the device. In some embodiments, an appearance of the tile, an image in the tile, or an interactive element can be modified corresponding to a gradual change in a state or an attribute/setting of the device until a desired state or value of an attribute/setting is reached. In some embodiments, a modification to the graphical interface may be shown before the device has in fact been adjusted corresponding to the input from interaction with the interactive area. In some embodiments, the graphical interface may be further modified upon receiving a response (e.g., confirmation) that the device has been adjusted according to an adjustment based on interaction with the interactive area. The graphical interface may be further modified to indicate that the device has actually been adjusted based on the input from interaction with the interactive area. For example, the graphical interface may be further modified to change an appearance of the device in the tile to indicate its adjusted state. The response can be received directly from the device or via the network, or the response can be received from any other device connected to the network.

In some embodiments, a user may create an account with login information that is used to authenticate the user and allow access to the network devices. For example, once an account is created, a user may enter the login information using an access device in order to access a network device located within a network.

In some embodiments, an accountless authentication process may be performed so that the user can access one or more network devices within a network without having to enter network device login credentials each time access is requested. While located locally within the local area network, an access device may be authenticated based on the access device's authentication with the logical network. For example, if the access device has authorized access to the network (e.g., a WiFi network provided by a gateway), the network devices paired with that logical network may allow the access device to connect to them without requiring a login. Accordingly, only users of access devices that have authorization to access the logical network may be authorized to access network devices within the network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway. The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. The network device and the access device may then communicate with the cloud server using the network ID and the unique key generated for each device. Accordingly, the user may remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there may no problem accessing both network devices due to the ability of the access device to perform local discovery techniques (e.g., universal plug and play (UPnP)). However, when the user is located remotely from the local area network, the access device may only be associated with one logical network at a time, which can prevent the access device from accessing network devices of other logical networks within the local area network.

A computing device (e.g., an access device) may determine that one or more network devices are connected to the local area network. The determination may be made based on whether the computing device is located within the wireless network of the device or located remote from the wireless network. The computing device may have access to the wireless network based on its authentication with a logical network which enables access to the wireless network. In some embodiments, the computing device may perform local network discovery while within the wireless network to identify the devices connected to the network. Upon determining that the computing device is not located within the network, the computing device can determine the devices in the network by communication with a cloud network to obtain information about the devices on the network. The cloud network can store a status of devices on the network. The computing device can also determine devices on the network by accessing a local cache that can contain information it has previously received about devices known to exist on the network. The computing device can determine a status of the devices based on its local cache, information received from the cloud, or by direct communication with the devices within the local network. The computing device can access status information from the local cache to present in a display to a user.

The computing device may execute an application that can cause the computing device to present a graphical interface including information (e.g., status, name, icon, etc.) about devices discovered on the network. The graphical interface can present a visual interface for each device accessible on the network. In some embodiments, the visual interface corresponding to a network device can be rendered as a modular tile with one or more interactive elements and/or one or more interactive areas to control operation of the device. The visual interface corresponding to a network device can provide a status or state of the network device (e.g., on/off). Information displayed in a visual interface can include, for example, a default icon, a default name, interactive elements, and/or interactive areas for controlling one or more functionalities of a network device. The functionalities can include, for example, powering the network device on and off. The functionalities can enable adjustment of adjustable attributes and/or settings for a device. For example, a device can be a light bulb, for which attributes or settings (e.g., brightness) can be controlled via the tile.

In some embodiments, updated information can be provided that causes the information displayed in a tile corresponding to a network device to be modified. The updated information may include updated image data, textual data, and/or a status of the device. In some embodiments, updated image data (e.g., a photo of an electronic device such as an appliance coupled to the network device) and textual data (e.g., a description of the electronic device) provided by a user may replace the default icon and default name received and displayed when the network device was first discovered on the network.

As described herein, techniques are provided for predictive modeling based on interactions with a network device. For example, interaction data corresponding to user interactions with a network device can be analyzed in combination with contextual data corresponding to a context in which the user interactions occurred. The user interactions may be an instruction causing the network device to perform a particular function. Correlations between the user interactions and contexts can be identified. Using such correlations, predictions of future user interactions can be generated and then tested by analyzing subsequent user interactions and contextual data to confirm whether the predicted user interaction occurred in the correlated context. When predictions are confirmed, automation of the network device function can be performed in response to subsequent occurrences of the correlated context.

User interactions in various contexts can be analyzed on an ongoing basis such that predictions are continuously evaluated for accuracy. As user behavior changes, predictions can be modified accordingly. Automation of the user's network devices based on generated predictions can be accomplished in a gradual manner to allow the user to gain trust in their network device functions being performed automatically. As such, embodiments of the invention may enhance the user experience by automating control of the user's network devices in a manner desirable to the user.

FIG. 1 shows an example wireless network environment, in accordance with some embodiments. The local area network 100 includes a network device 102, a network device 104, and network device 106. In some embodiments, the network devices 102, 104, 106 may include home automation network devices that allow a user to access, control, and/or configure various home appliances located within the user's home, such as a television, radio, light, a fan, a humidifier, a sensor, microwave, iron, and/or the like. For example, network device 102 may include a home automation switch that may be coupled with a home appliance. In some embodiments, network devices such as a home automation network device may be used in other environments, such as a business, a school, an establishment, or any place that can support the local area network 100 to enable communication with network devices. For example, a network device can allow a user to access, control, and/or configure devices including office-related devices (e.g., copy machine, printer, fax machine, the like), audio-related devices (e.g., a receiver, a speaker, the like), media-playback devices (e.g., a compact disc player, a CD player, the like), video-related devices (e.g., a projector, a DVD player, the like), computing devices (e.g., a home computer, a laptop computer, a tablet, a personal digital assistant (PDA), a computing device, a wearable device, the like), lighting devices (e.g., a lamp, a light bulb, the like), devices associated with a security system, devices associated with an alarm system, and devices that can be operated in an automobile (e.g., radio devices, navigation devices, the like).

A user may communicate with the network devices 102, 104, 106 using an access device 108. The access device 108 may include any human-to-machine interface with network connection capability that allows access to a network. For example, the access device 108 may include a stand alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect® sensor, Wiimote®, or the like), an internet of things (IoT) device interface (e.g., an Internet enabled appliance such as a wall switch, a control interface, or the like). While only a single access device 108 is shown in FIG. 1, one of ordinary skill in the art will appreciate that multiple access devices may connect with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee®, Bluetooth®, WiFi®, IR, cellular, LTE, WiMax®, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can be utilized for providing communication capabilities to network devices 102, 104, 106 and/or access device 108 via radio signals in order to provide communication, location, and/or other services to the devices. While two gateways 110 and 112 are shown in FIG. 1, one of ordinary skill in the art will appreciate that any number of gateways may be present within the local area network 100. The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may transmit and receive radio frequencies with which wireless enabled devices in local area network 100 can communicate. A gateway may also be referred to as a base station, an access point, Node B, Evolved Node B (eNodeB), access point base station, a Femtocell, home base station, home Node B, home eNodeB, or the like. The gateways 110, 112 may include a router, a modem, a range extender, and/or any other device that provides network access among one or more computing devices and/or external networks. For example, gateway 110 may include a router and gateway 112 may include a range extender.

The gateways 110 and 112 may also provide the access device 108 and the network devices 102, 104, 106 with access to one or more external networks, such as the cloud network 114, the Internet, and/or other wide area networks. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Upon being powered on or reset, the network devices 102, 104, 106 may be registered with the cloud network 114 and associated with a logical network within the local area network 100. When multiple network devices 102, 104, 106 and gateways 110, 112 are included within a local area network, the network devices and/or gateways may be installed at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

A network device may detect one or more gateways upon being powered on or reset. In some embodiments, a provisioning process may occur when the network device is powered on or reset and detected by an access device. During the provisioning process, the access device 108 may directly communicate with the network device. In some embodiments, direct communication between network devices 102, 104, 106 and access device 108 may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the gateway. For example, the login information may be the same information that was originally set up to access the gateway network signals (e.g., when the gateway was initially installed). The access device may send the login information to the network device. The network device may use the login information to pair with the selected gateway.

As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway.

A network device may obtain credentials from a gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the wireless local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

A network device may then send the credentials (e.g., gateway credentials) to the cloud network. For example, the network devices 102, 104, 106 may send credentials for the gateway with which they are paired to the server located within the cloud network 114. For example, network device 102 may transmit the credentials obtained from gateway 110 to the server, and network device 106 may transmit the credentials obtained from gateway 112 to the server. In some embodiments, the network device may also send other information relating to the network device (e.g., MAC address, serial number, make, model number, firmware version, and/or an interface module identifier, or the like) to the server and/or information relating to the access device (e.g., MAC address, serial number, application unique identifier, or the like) to the server. In some embodiments, the communication of the credentials and the other information from the network device to the cloud network server may be a Hypertext Transfer Protocol (HTTP), a Hypertext Transfer Protocol Secure (HTTPS) communication, a secure Transmission Control Protocol (TCP) communication, or the like. One of ordinary skill in the art will appreciate that other communication mechanisms may be used to communicate between the network device and the cloud network server.

Once the credentials are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

Once the unique IDs are received by the server, the server may register each network device and determine a visual interface module for each network device. For example, the server may register the network device 102 as a first network device. During the registration process, the server may determine or generate a first interface module ID for identifying a visual interface module suitable for controlling the first network device. As noted above, one of ordinary skill in the art will appreciate that any number of network devices may be present within the local area network, and thus that any number of network devices may be discovered and registered for the local area network.

In some embodiments, a modular visual interface framework may be utilized to dynamically and implicitly provide visual interface modules to an access device 108 so that the access device 108 can be used to control network devices within a network without having to install a new application or a version of an application for each network device. The visual interface modules can enable a user of the access device 108 to remotely control network devices within a network without having to physically interface with the network device. In certain embodiments, an application installed on the access device 108 can have a graphical interface, and the application can be configured to execute one or more visual interface modules usable to control respective network devices in a local area network. The visual interface modules, when executed by an application, can render a visual interface in the graphical interface to enable control of operation of the network device. In some embodiments, the visual interface module can be specific to a given network device.

The visual interface rendered for a visual interface module can be a modular tile that includes information identifying a respective network device and includes interactive areas or interactive elements for controlling and/or monitoring the network device on a network. The visual interface can provide information about a status of the network device corresponding to the tile. The status of a network device may be any changeable variable of that particular network device. For example, the status of a network device may include a state of the network device itself (e.g., on or off) or how the network device is situated within the network with respect to the other network and other devices throughout the network. In certain embodiments, the status can include a value, a state, or other unit of measure corresponding to a setting or an attribute related to operation of a device. The setting or the attribute can be adjustable within a range of values or between different states. For example, the device can be a light bulb and the status can include a value corresponding to brightness (e.g., a percentage of total brightness) emitted by the light bulb when the light bulb is powered-on.

The visual interface can include one or more interactive elements or interactive areas to control one or more settings and/or attributes related to operation of the network device corresponding to the visual interface. The settings and/or attributes can correspond to functionalities or features of the network device. The functionalities can include, for example, powering the network device on and off, or adjusting a setting or an attribute of the network device. The visual interface can be updated to reflect the status of the network device with respect to the adjustment of one or more attributes and/or settings. Operation and implementation of the modular visual interface framework is described below with reference to FIG. 2. In particular, FIGS. 3-4 and 8-12 show examples of visual interfaces that enable a user to control attributes and/or settings related to operation of network devices controllable via a computing device.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network. Also such embodiments where the server may determine that the access device 108 has already been registered with another network device, the server may have used a unique ID for the previously discovered network device 102 to determine a first interface module suitable for controlling the network device 102. Further in such embodiments, the server may use another unique ID for the network device 104 to identify a second interface module suitable for controlling network device 104.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier. The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

A record or profile may then be created in a data store at the server for associating each network device with a corresponding, known interface module so that the interface module can be provided to the access device. For example, the server of the cloud network 114 may associate the first network device 102 with a first interface module. Similarly, the server may associate the second network device 104 with a second interface module. In some embodiments, the server performs the association by generating and storing a record including the unique ID of the network device (e.g., MAC address or serial number of a network device), a unique ID of an interface module suitable to control the network device, and/or any other information relevant to the network device and/or the interface module. For example, the server may store a first record at a first memory space (e.g., in Flash, DRAM, a data store, a database, or the like) with the unique ID of the network device 102 and the unique ID of an interface module for monitoring and controlling the network device 102. The server may also store a second record at a second memory space along with the unique ID of the network device 106 and the unique ID of an interface module for monitoring and controlling the network device 106. The technique used to store records for associating each network device with a corresponding interface module may be dependent on a type of database that is included in the cloud network 114. For example, different databases may have different proprietary mechanisms for creating unique identifiers. The unique identifiers for each interface module may be generated using database specific technique. For example, a MySQL technique may be used to generate the unique IDs for interface modules. Each unique ID for interface modules may include a universally unique identifier (UUID) or a globally unique identifier (GUID).

The network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server. The server may also associate the network device 104 with a known interface module. The server may also generate a record in a data store of interfaces for the network device 104. The access device 108 may receive the interface module for controlling the network device 104 from the server, and then store the interface module in a local cache.

Then, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may then process the signature in order to authenticate each device, as described below. The network device and access device may use different techniques to generate a signature.

A network device may generate a signature using its uniquely generated security key. For example, the signature may be expressed as: Authorization=MacAddress":"Signature": "ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

As previously described, the access device, when located within range of the local area network, may be authenticated using accountless authentication that is based on the access device's authentication with the logical network. For example, if the access device has authorized access to the logical network (e.g., a WiFi network provided by a gateway), the network devices paired with that logical network may allow the access device to connect with them without requiring a network device login. Accordingly, the network device may perform accountless authentication of access devices that have authorization to access the logical network without requiring a user to provide login credentials for the network devices. While located remotely, the access device may also be authenticated to access the network devices via the cloud network using an accountless authentication process. For example, the network ID and the access device's unique security key may be used to allow the access device to communicate with the network devices via the cloud network (e.g., by generating a signature as described above).

When the access device 108 is located within range of both gateways 110, 112 in the local area network 100, the access device 108 does not encounter any issues when attempting to access any of the network devices 102, 104, 106. For example, the access device 108 may perform UPnP discovery and may list all if the network devices 102, 104, 106 that have responded to the discovery request regardless of which network ID the network devices 102, 104, 106 have. Accordingly, the existence of the first and second logical networks with first and second network IDs does not lead to any issues when the access device 108 is located within the local area network 100. However, when the user is located remotely, the access device 108 may only be associated with one logical network at a time. For example, the access device 108, while located remotely from the local area network 100, may query the cloud server with a known network ID (e.g., the first or second network ID). In response, the server will only return the network devices associated with that network ID. As a result, the user will not be able to see all network devices within the user's local area network 100.

Figure 2:
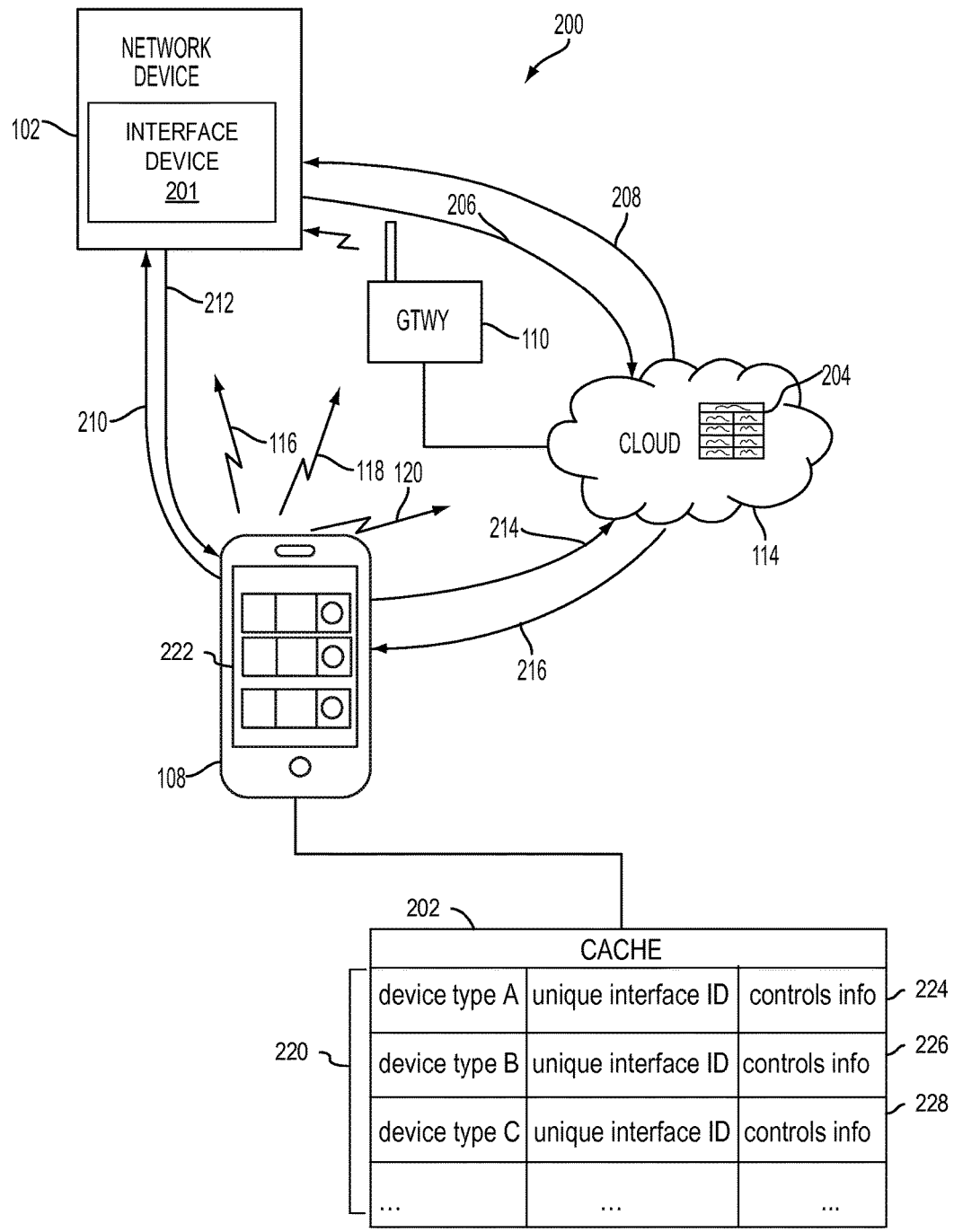
FIG. 2 shows a process for providing a visual interface module for controlling a network device in a wireless network, in accordance with some embodiments.

FIG. 2 shows a process 200 for providing a visual interface module for controlling a network device in a wireless network, in accordance to some embodiments. As shown, the process 200 may be performed by one or more computing devices, such as network device 102, a server associated with cloud network 114, or access device 108 described above with reference to FIG. 1. In some embodiments, the network device 102 is associated with a home automation network, such as the local area network 100 described above with respect to FIG. 1. Process 200 is illustrated as a data flow diagram, the operation of which represents operations that can be implemented in hardware, computer instructions, or a combination thereof. Gateway 110 is connected to cloud network 114, and allows network device 102 to connect to the cloud network 114, the Internet, or other external networks via gateway 110. In some embodiments, the network device 102 may be a home automation network device that allows a user to access, monitor, control, and/or configure various home appliances located within the user's home, such as a television, radio, light bulb, microwave, iron, fan, space heater, sensor, and/or the like. In some embodiments, the user can monitor and control network devices by interacting with a visual interface rendered by the gateway 110 (i.e., a web page for gateway 110), a visual interface rendered on display 222 of the access device 108, or a visual interface rendered by the network device 102.

In an embodiment, an application may be run on the access device 108. The application may cause the access device 108 to present a display 222 with a modular visual interface for each network device accessible on the local area network 100. When the application is run on the access device 108, the access device 108 can access a cache 202.

The cache 202 can be a local cache located in onboard storage of the access device 108. The cache 202 can contain a known interface list 220 with records 224, 226 and 228 including interface information for different, known types of network devices. As shown, each of records 224, 226 and 228 can include a device type, a unique interface module ID, and controls information. The known interface list 220 can include a record for each device known by the access device 108 to exist on the local area network 100. When the application is run on the access device 108, the access device 108 can access the known interfaces 220 in the cache 202 to present the display 222, which lists modular interfaces for each network device on the local area network 100. In an example, the display 222 can include a modular tile for each connected network device having an interface in the known interface list 220. Exemplary communications used to populate cache 202 are described in the following paragraphs.

The process 200 can include utilizing communication 206 to register a visual interface module for a network device 102 with a server of cloud network 114. For simplicity, communication 206 is shown as a direct communication between network device 102 and cloud network 114. However, it is to be understood that in an embodiment, communication 206 can be sent from a manufacturer of network device 102 to cloud network 114. In an additional or alternative embodiment, communication 206 is sent from third party interface developer to cloud network 114. For example, a third party developer of a visual interface module for network device 102 may initiate communication 206 to cloud network 114. In the example of FIG. 2, communication 206 includes registration information for the network device 102. For example, communication 206 can include a unique device ID for network device 102. In some embodiments, the registration information may identify one or more capabilities of network device 102. The registration information can include a unique identifier for the network device, a default name of the network device, one or more capabilities of the network device, and one or more discovery mechanisms for the network device. In one example, communication 206 can include a resource bundle corresponding to network device 102. The resource bundle can be embodied as a structured folder structure whose contents define all visual and interactive elements/areas in a tile. For example, a resource bundle can be a zip file sent from a device manufacturer or a third party developer that is submitted or uploaded to cloud network 114. The resource bundle includes a unique device ID and files defining graphical content of a visual interface module. The graphical content can include definitions of interactive elements/areas for the interface module. The resource bundle can include templates defining interactive control states for each of the interactive elements, language translations for tile text, any menus for the tile, and graphical content of the menus. For example, the resource bundle can define templates, text, and graphical content using a markup language, such as HTML5.

At 206, the process 200 includes transmitting an indication that network device 102 is associated with the network. For example, network device 102 may transmit the indication to the server of the cloud network 114. In some embodiments, transmitting may include transmitting a unique identifier (ID) for the network device 102. For example, the network device 102 may send a communication to the server indicating a unique interface module ID for the network device 102. In such embodiments, the server may then determine that a match between the unique interface module ID and a known interface exists. The cloud network 114 can include a data store 204 of known interfaces. The access device 108 can download a visual interface module identified in data store 204 from the cloud network 114, which can be used to render a modular interface within display 222. In an embodiment, data store 204 can be a tile database where each record in the database is uniquely identified by a tile ID.

Cloud network 114 can use the unique device ID to determine an interface module for network device 102. As shown in FIG. 2, cloud network 114 can access a data store 204 of visual interface modules. A plurality of uniquely identified interface modules can be stored in data store 204. For example, each interface module in data store 204 can be associated with a unique interface module ID. In an embodiment, data store 204 is a database configured to store modular tiles for a plurality of network devices, with each of the stored modular tiles being identified by a unique tile ID. For instance, the network device 102 having a unique device identifier may be matched with an existing interface module based on comparing information received from the network device 102 with information stored in data store 204. In cases where an existing interface module for network device 102 is not found in data store 204, cloud network 114 can use information in a resource bundle for the network device 102 to generate an interface module, where the resource bundle is provided as part of a registration process for a given network device. The generated interface module can then be stored in data store 204 and assigned a unique interface module ID. In some embodiments, information in the resource bundle can be used to update an existing interface module stored in data store 204. After determining the interface module for network device 102, cloud network 114 sends communication 208 to network device 102 in order to provide a unique interface module ID to the network device 102. In one embodiment, communication 208 can include a unique tile ID corresponding to a modular tile for network device 102 that is stored in data store 204. In some embodiments, communication 208 includes a unique tile ID corresponding to a modular tile defined for network device 102. Upon receiving communication 208 with the unique interface module ID (i.e., a unique tile ID), the network device 102 can store the unique interface module ID. In one embodiment, for example, the unique interface module ID can be stored by an interface device 201 of the network device 102 that is configured to provide the interface module ID to an access device or gateway. In an embodiment, the interface device 201 is implemented as a 'smart module' in hardware and firmware, such as, for example, a system on a chip (SOC) integrated into the network device 102.

The interface device 201 can include flash memory and dynamic random access memory (DRAM). The flash memory may be used to store instructions or code relating to an operating system, one or more applications, and any firmware. The flash memory may include nonvolatile memory so that any firmware or other program can be can updated. In the event the interface device 201 loses power, information stored in the flash memory may be retained. The DRAM of the interface device 201 may store various other types of information needed to run the interface device 201, such as all runtime instructions or code. The flash memory or DRAM or a combination thereof may include all instructions necessary to communicate with network device 102.

The process 200 can include sending, from the access device 108, intra-network communication 210 including a query, to the network device 102. The query can be a request for information such as a query for capabilities, a request for an identity of the network device 102, and/or a request for a unique interface module ID. For example, communication 210 can be sent from access device 108 to network device 102 to query network device 102 about its identity. In response to the query sent from access device 108, the process 200 can include receiving intra-network communication 212 at the access device 108 with device information for the network device 102. According to an embodiment, in response to the query, the network device 102 can send communication 212 to inform the access device 108 of the identity and/or capabilities of the network device 102. For instance, in response to receiving the query, the network device 102 may send communications 212 to the access device 108 with at least a unique interface module ID. The process 200 can include utilizing intra-network device communications 210 and 212 as part of a discovery process for the network device 102. For example, when the network device 102 is initially connected to the network, it and access device 108 can automatically exchange communications 210 and 212 to provide the access device 108 with information that can be used to determine a basic, default visual interface stored in cache 202.

Within the context of a modular tile framework, embodiments can dynamically render a functional user interface without having to download the appropriate interface template from a remote server, such as a server associated with the cloud network 114, in order to control a newly discovered network device. These embodiments can be used in cases where a connection to the Internet or the cloud network 114 is unavailable or unreliable, and immediate use of a newly discovered network device is desired. In this case, an application on the access device 108 or a stationary device such as gateway 110 could, based on certain information received from the network device 102, dynamically render a functional interface for immediate use. Such a functional interface may not be the ideal, visually optimized, interface that is downloadable from the cloud network 114. However, such a functional interface will suffice until the application is able connect to the Internet and/or the cloud network 114 and subsequently download the appropriate and visually optimized interface module for the network device 102.

In some embodiments, communication 212 may be received when the network device 102 is rebooted (e.g., powered on, reset or restored to default settings, or the like). For example, when the network device 102 is rebooted, it may broadcast one or more messages on the local area network 100 to discover whether there are any access devices in the local area network 100. For example, communication 212 may be broadcast according to a UPnP protocol during a discovery process. The network device 102 may receive communications 210 from access device 108 indicating that it is located within the local area network 100 and interrogating network device 102 about its functionalities. That is, after receiving a broadcast message from network device 102, access device 108 may then query network device 102 by sending communication 210 in order to receive the communication 212 including information about the network device.

After receiving communication 212, if the access device 108 can access the cloud network 114, it sends a communication 214 to the cloud network 114 as a request for an interface module for the network device 102. Communication 214 is described in further detail below. Otherwise, if the access device 108 cannot access the cloud network 114, the access device 108 looks up the unique interface module ID received from the network device 102 in cache 202. As discussed above, cache 202 can be a local cache stored on the access device 108. Basic properties for known interfaces can be stored in cache 202 as a device type and controls information. These basic properties can include, for example, a default icon, a default name, and interactive elements or interactive areas for controlling one or more primary functionalities of a network device. The primary functionalities can include, for example, powering the network device on and off. The basic properties can also include controls information for secondary functionalities.

In some embodiments, when the access device is connected to the cloud network 114, the access device 108 sends communication 214 to query the cloud network 114 about network device 102. The communication 214 can include at least the unique interface module ID for the network device 102. At this point, the cloud network 114 can compare the unique interface module ID of the network device 102 to known interface module IDs stored in data store 204 in order to determine that there is a match between the unique interface module ID sent with communication 214 and a known interface module. If the cloud network 114 finds an interface module in its data store 204, it transmits the interface module to the access device 108 via communication 216. For example, if the access device 108 is currently using a default interface module for network device 102 that was determined based on exchanging communications 210 and 212, and then subsequently is able to connect to the cloud network 114, communications 214 and 216 between the access device 108 and the cloud network 114 can be used to obtain an updated interface module for the network device 102.

Upon receiving communication 216 from the cloud network 114, the access device 108 populates a record in cache 202 corresponding to the network device 102 with device type and controls information received via communication 216. That is, when the access device is remote from the local area network 100, it can exchange communications 214 and 216 with the cloud network 114 to receive an interface module for a network device. Information received via communications 216 can be used to populate records of cache 202. Records in cache 202 can be updated using modular interfaces received via communication 216. In additional or alternative embodiments, new records can be created in cache 202 when communication 216 includes a modular interface for a newly discovered network device.

Records 224, 226, 228 in cache 202 store device types, unique interface module IDs, and controls information for known network devices. The access device 108 uses the records in cache 202 to render visual interfaces in the display 222. For example, the display 222 can include a navigable list of modular tiles corresponding to network devices in the local area network 100.

Display 222 can also include an indicator representing a state of network device 102. In embodiments, communications 212 and/or 214 can include a last known state of the network device 102 and/or historical data associated with the network device 102. In one embodiment, such state information can be based on information received via communication 212 from the network device 102 when the access device 108 is connected to the local area network 100. In this way, display 222 of the access device 108 can reflect a current state and historical data for the network device 102 when the access device is not connected to the local area network 100. In additional or alternative embodiments, the state information can be based on information received via communication 216 from the cloud network 114 when the access device 108 is connected to the cloud network 114. Using the state information, an interface module or tile for the network device 102 within display 222 can indicate an 'on' or 'off' state for the network device 102 when the network device is powered on or off.

Figure 3:
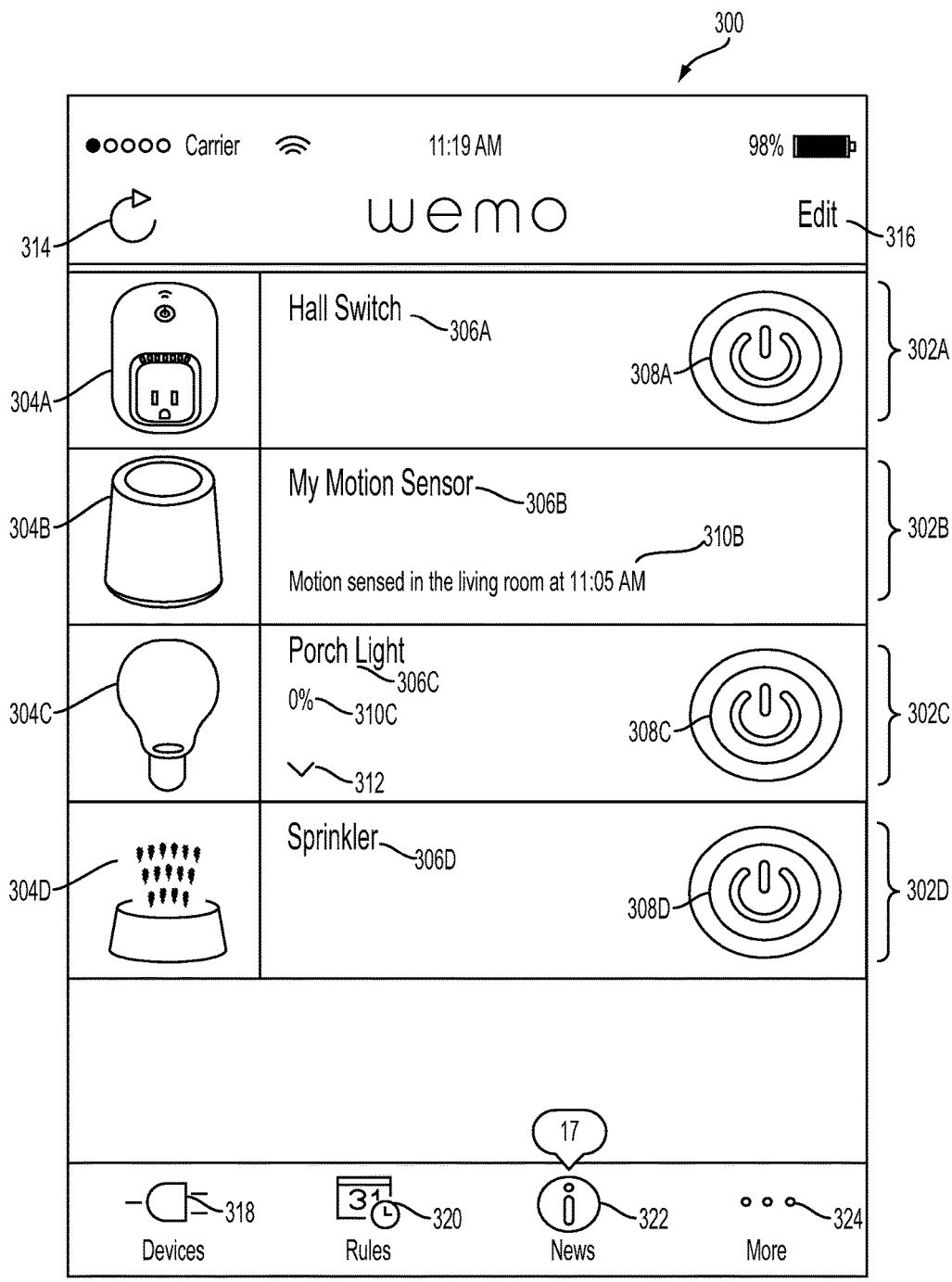
FIG. 3 shows an example interface for controlling network devices, in accordance with some embodiments.

FIG. 3 shows an example interface 300 for controlling network devices, in accordance with some embodiments. The interface 300 includes modular tiles 302A, 302B, 302C, and 302D (hereinafter "tiles 302") for interacting with network devices in a network using various interactive elements. The interactions can include monitoring and controlling the network devices. The tiles 302 each include respective icons 304A, 304B, 304C, and 304D (hereinafter "icons 304"), and respective textual descriptions 306A, 306B, and 306C identifying the different network devices. In this example, tile 302A is configured to control a switch network device. Tile 302A includes an icon 304A representing the switch and text 306A for the switch. In some embodiments, tiles 302 are customizable. For example, description 306A is customized to indicate the location of a switch in the user's residence (e.g., "Hall switch"). Tile 302A also includes an interactive element 308A that can be selected to control the switch. For example, interactive element 308A can be selected with a click or press to turn the switch on and off.

Tile 302B includes an icon 304B for a motion sensor network device, and includes icon 304B representing the sensor and a description 306B for the sensor (e.g., "My Motion Sensor"). In embodiments, tiles 302 are customizable to display a current state or status of the network devices. For example, tile 302B is customized to indicate a sensor-specific status (e.g., "Motion sensed in the living room at 11:05 AM"). In some embodiments, tiles 302 can convey status information about a network device, including, but not limited to, a firmware version, a last known firmware update status, connectivity to cloud status, registration status (i.e., an indication that the network device has a key or does not), a primary mode of the network device (i.e., on, off), a secondary mode of the device (i.e., standby, high, low, eco), a schedule, settings for the network device, and/or other information.

In certain embodiments, the status or state of a device (used interchangeably) can be indicated within the tile with text and/or graphically. The status of the device can change based on time (e.g., a period, an interval, or other time schedule). The status of a device may be any piece of information pertinent to that particular device. The status of a device may be any changeable variable of that particular device. For example, the status of a device may include a state of the device itself (e.g., on or off) or how the device is situated within the network with respect to the other network and other devices throughout the network. For example, the status of a device may refer to the device's proximity to another device and/or its ability to communicate with another device because of the relative signal strength between the two devices. In certain embodiments, the status can include a value or some other information indicating a unit of measure for a setting or an attribute related to operation of a device. The setting or the attribute can be adjustable within a range of values. For example, the device can be a light bulb and the status can include a value corresponding to brightness (e.g., a percentage of total brightness) emitted by the light bulb when the light bulb is powered-on. In another embodiment, the device can be a motion sensor and the status can include a value corresponding to sensitivity of the sensor in a range of values between 0 to 100 when the sensor is powered-on. In yet another embodiment, the device can be a fan and the status can include a value corresponding to a speed of the fan on a scale of 0 to 100 when the fan is powered-on.

As seen in FIG. 3, status 310B of the motion sensor indicates when and where the motion sensor last detected motion, and the status 310C in the tile 302C for a porch light can indicate a brightness level for the porch light. In the exemplary interface 300, status 310C indicates that the porch light is at 0%, which corresponds to the porch light being turned off. In an embodiment, this status may also be reflected by the power button 308C for the porch light not being lit up or shaded/bolded. When a network device has extended capabilities, such as secondary or tertiary functionalities, an interactive element 312 can be selected to expand and contract a menu including controllable settings for the capabilities. The menu can be, for example, a full drop down menu or drawer with interactive elements for setting the extended capabilities of the network device.

Tile 302D displays a sprinkler and/or series of sprinklers. Tile 302D can include an icon 304D that represents one or more sprinklers (e.g., each sprinkler head, a sprinkler control network device that manages one or more sprinklers, the like), and a description 306D (e.g., "sprinkler"). The power button 308D can indicate whether the sprinklers are currently turned on.

Interface 300 can also include selectable elements 314, 316, 318, 320, 322, and 324 outside of the tile display area. For example, refresh element 314 can be selected to refresh information presented in interface 300, such as status and state information displayed in tiles 302. For instance, the status 310B in tile 302B for the motion sensor can also be updated updated when refresh element 314 is selected. Similarly, the brightness status 310C in tile 302C for the porch light can be updated when refresh element 314 is selected. The edit link 316 can be selected to edit the list of tiles 302A, 302B, 302C, and 302D. For example, edit element 316 can be selected to sort or re-order the sequence of tiles 302A, 302B, 302C, and 302D displayed in interface 300. Edit element 316 can also be selected to delete one of the tiles 302A, 302B, 302C, and 302D in cases where a user no longer wants to view a given tile. Devices element 318 can be selected to list discovered network devices in the network.

News element 322 can be selected to review news items, such as news associated with network devices and/or the application. For instance, news element 322 can be selected to view announcements and news items relevant to network devices controlled via tiles 302A, 302B, 302C, and 302D and/or information relevant to the application. The more element 324 can be selected to access additional features of the application.

Rules element 320 can be selected to display rules pertaining to network devices. For example, rules element 320 can be selected to display a rule that turns on the porch light of tile 302C for a specified duration when the motion sensor of tile 302B detects motion. That is, by selecting rules element 320, a user can create, edit, or delete a rule associated with functions of one or more network devices.

Figure 4:
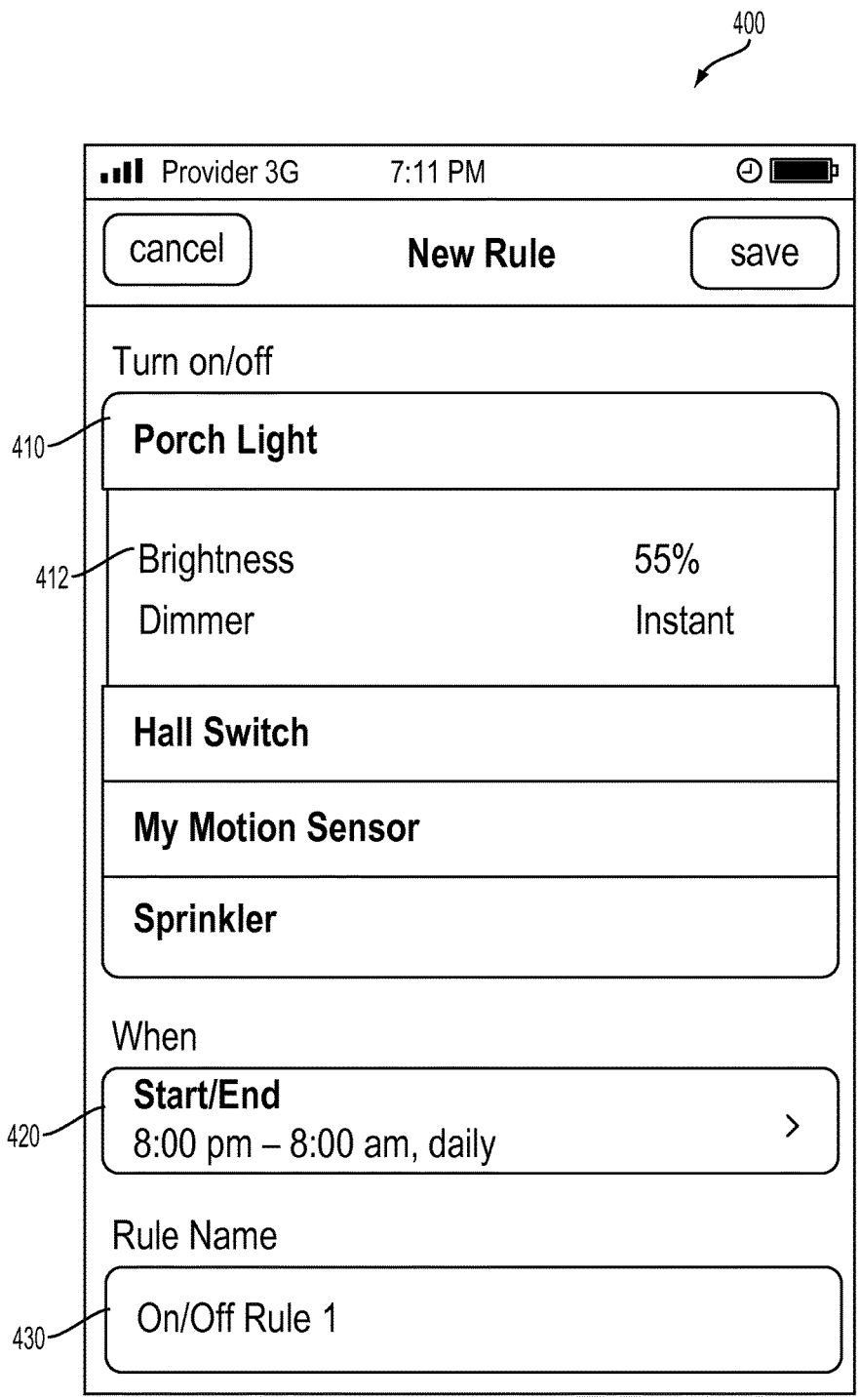
FIG. 4 shows an example interface for creating a new rule assigned to a network device, in accordance with some embodiments.

FIG. 4 shows an example interface 400 for creating a new rule assigned to a network device, in accordance with some embodiments. The interface 400 includes device tiles 410, scheduling element 420, and naming element 430. Interface 400 may be displayed in response to the user selecting rules element 320 of interface 300 shown in FIG. 3 and selecting, for example, a "new rule" or "add rule" element. As seen in FIG. 4, device tiles 410 can include tiles for the network devices shown in interface 300 of FIG. 3. In some embodiments, device tiles 410 corresponding to the network devices shown in interface 300 can be automatically generated and displayed. In some embodiments, the user can manually add or remove device tiles 410. The user may activate any of the device tiles 410 to assign rules to the corresponding network device. As illustrated, the user may activate (e.g., using touch input) the device tile corresponding to the network device "porch light" to assign a rule to the porch light. The activated device tile 412 can include various parameters of the rule. In this example, the porch light is assigned an on/off rule where the "on" state is associated with a 55% brightness and where the transition from an "on" to "off" state is performed instantly with no dimming.

The scheduling element 420 may be selected to provide time parameters for the rule displayed in the activated device tile 412. In some embodiments, selecting the scheduling element may 420 provide one or more additional interfaces for providing time parameters for the rule. In this example, the scheduling element 420 indicates that the porch light will automatically turn on from 8 pm to 8 am every night in accordance with the new rule. The naming element 430 can be a field in which a name can be entered and assigned to the rule. The name can be provided by the user, or automatically generated. In this example, the naming element 430 indicates that the rule has been named "On/Off Rule 1".

Figure 6:
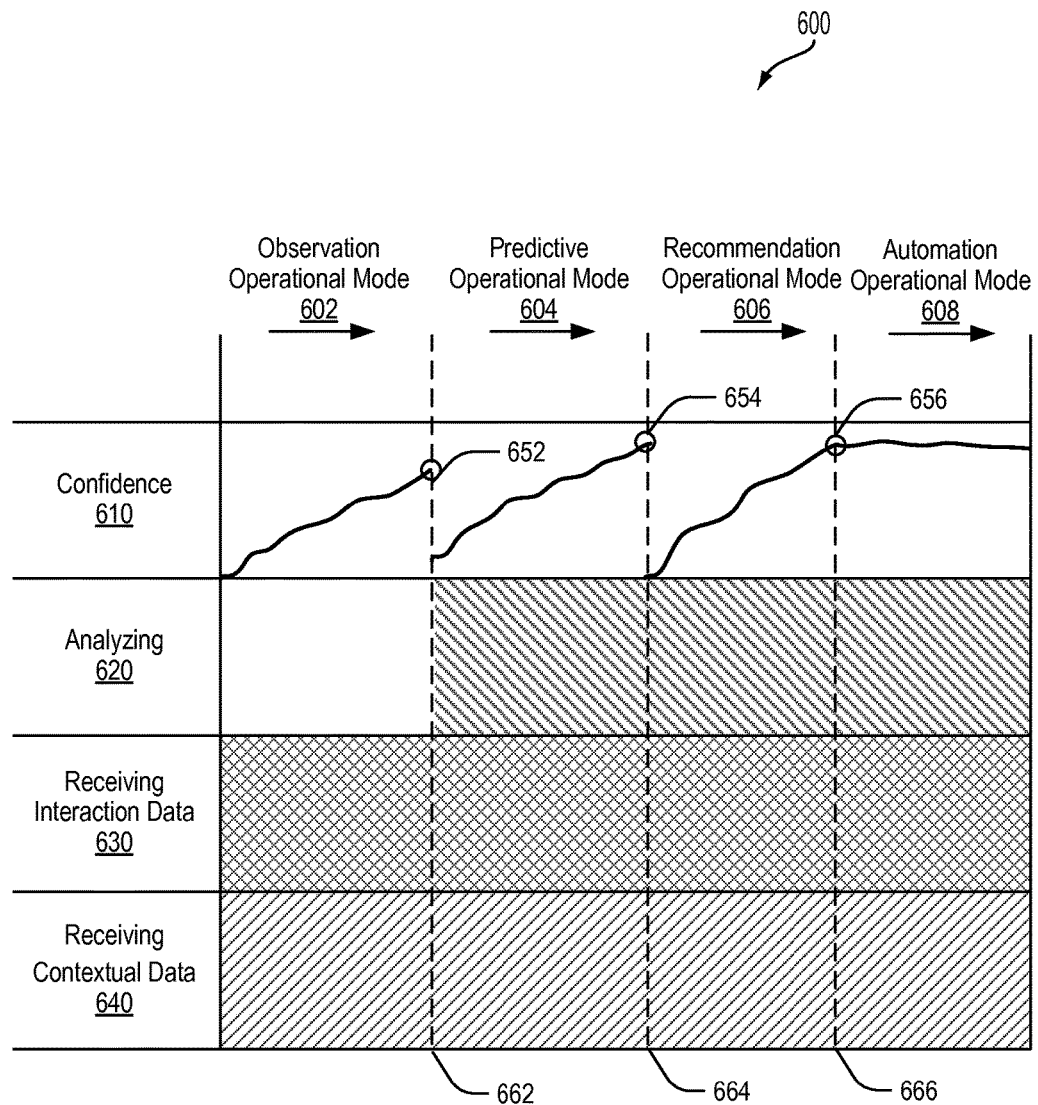
FIG. 6 shows a process for predictive modeling based on interactions with a network device, in accordance with some embodiments.

FIG. 6 shows a process 600 for predictive modeling based on interactions with a network device, in accordance with some embodiments. The predictive modeling can be performed by any suitable computing device including, but not limited to, a cloud-based device (e.g., in the cloud 114 of FIG. 1), a network device (e.g., network devices 102, 104, and/or 106), a gateway (e.g., gateway 110 and/or 112), an access device (e.g., access device 108), or any combination thereof. As shown in FIG. 6, the computing device can operate in various operational modes sequentially over time, including an observation operational mode 602, a predictive operational mode 604, a recommendation operational mode 606, and an automation operational mode 608. More, less, or different operational modes may be utilized in some embodiments.

As shown in FIG. 6, the computing device can begin in the observation operational mode 602 which may be a mode during which data is gathered. For example, interaction data 630 and contextual data 640 can be received. In some embodiments, the interaction data 630 can correspond to user interactions with a network device. Such interactions can relate to a function of the network device and can include, for example, the user changing the state of the network device (e.g., on, off, brightness, etc.), assigning rules to the network device, manually overriding rules assigned to the network device, deleting rules assigned to the network device, modifying rules assigned to the network device, and any other suitable interaction between the user and the network device. The interaction data 630 can be provided by a network device, gateway, access device, cloud-based device, or any other suitable computing device. As an illustration, the received interaction data 630 may correspond to the user turning on a porch light network device. As another illustration, the received interaction data 630 may correspond to the user manually overriding a rule that operates a sprinkler network device at a scheduled time.

The received contextual data 640 can describe any suitable contexts in which the user interactions with the network device occurred or contexts otherwise associated with the user interactions. The contextual data 640 can include, but is not limited to, sunrise/sunset data, weather data, news data, sports data, information about holidays and special events, travel data, information about other users' interactions with other network devices in different networks, and any other suitable context in which the user interacts with their network devices or that is otherwise associated with such interactions. The contextual data 640 can be received from any suitable source. In some embodiments, the contextual data 640 can be received from a source different than the source of the interaction data 630. Such a data source can be a remote server computer, a webpage, a source of information about interactions by other users with the network devices in their networks, and/or any other suitable data source external to the user's network in which the network device operates. In some embodiments, the contextual data 640 can be obtained using other network devices such as one or more sensors that are included in and/or external to the user's network. For example, the contextual data 640 can be received from a motion sensor, video camera, biometric sensor, temperature sensor, humidity sensor, pressure (e.g., atmospheric) sensor, and/or the like, included in the user's network or in the network of another user.

When in the observation operational mode 602, a confidence value 610 can be continuously calculated and updated as the interaction data 630 and contextual data 640 are received. When the confidence value 610 reaches a threshold value 652, the computing device can move from the observation operational mode 602 to the predictive operational mode 604. The threshold value 652 can be any suitable value. For example, the threshold value may include a threshold number of interactions, a threshold amount of data, or any other suitable metric.

During the predictive operational mode 604, the interaction data 630 and contextual data 640 received during the observation operational mode 602 can be analyzed 620 by the computing device. The analysis can include identifying correlations between the user interactions with the network device and the contexts in which the interactions occurred. Based on such analysis, predictions can be generated. These predictions can then be tested by analyzing 620 further received interaction data 630 and contextual data 640.

For example, referring back to the porch light example, a correlation may be identified indicating that the user regularly turns their porch light on at sunset. In this example, the time of day and change of state of the porch light can be included in the received interaction data 630, and the received contextual data 640 can indicate that the time of day included in the interaction data 630 corresponds to sunset at the user's location. Upon identifying this correlation in the predictive operational mode 604, the computing device can generate a prediction that the user will turn on their porch light in the future at sunset. This prediction can then be tested by analyzing further interaction data 630 and contextual data 640.

In the sprinkler illustration, a correlation may be identified indicating that the user manually overrides the scheduled operation of the sprinkler when it is raining. In this example, the date (e.g., month, day, and year) and change of state of the sprinkler can be included in the received interaction data 630, and the received contextual data 640 (e.g., from a weather data source) can indicate that rain occurred at the user's location on the dates included in the interaction data 630. Based on this identified correlation, the computing device can generate a prediction that the user will manually override the scheduled sprinkler operation when it is raining or when rain is forecasted. As with the porch light illustration, this prediction can then be tested by analyzing further interaction data 630 and contextual data 640.

As shown in FIG. 6, upon transitioning from the observation operational mode 602 to the predictive operational mode 604, the confidence value 610 can be reset to some value. As predictions are generated and tested in the predictive operational mode 604, the confidence value 610 can begin to increase again until a threshold value 654 is reached. For example, each time the predicted correlation is confirmed based on testing the prediction against received interaction data 630 and contextual data 640, the confidence value 610 may increase. Similarly, if a prediction does not hold true when the correlated context occurs, the confidence value 610 may decrease or may remain the same. As described above, in some embodiments, the contextual data 640 can include data describing interactions by other users with their network devices in various contexts. If correlations are identified in this data, i.e. if other users that are similarly situated (e.g., similar location, demographic, or other attribute) interact with the same type of network device in the correlated context, this can further increase the confidence value 610 in the predictive operational mode 606. If the confidence value falls below some lower limit, in some embodiments, the computing device may revert back to the observation operational mode 602 where data is gathered again.

When the confidence value 610 reaches the threshold value 654, the computing device can transition from the predictive operational mode 604 to the recommendation operational mode 606 in which automation request messages can be provided to the user. For example, after generating and confirming a prediction in the predictive operational mode 604, the computing device can transmit an automation request message to the user asking if the user authorizes that the function of the network device be automatically performed. In some embodiments, the computing device can continue to gather contextual data 640. When the received contextual data 640 includes the correlated context, the computing device may then transmit an automation request message to the user asking if the user authorizes that the function of the network device be automatically performed. The automation request message can be provided to the user as a notification in an interface (e.g., on a display of an access device).

Figure 8:
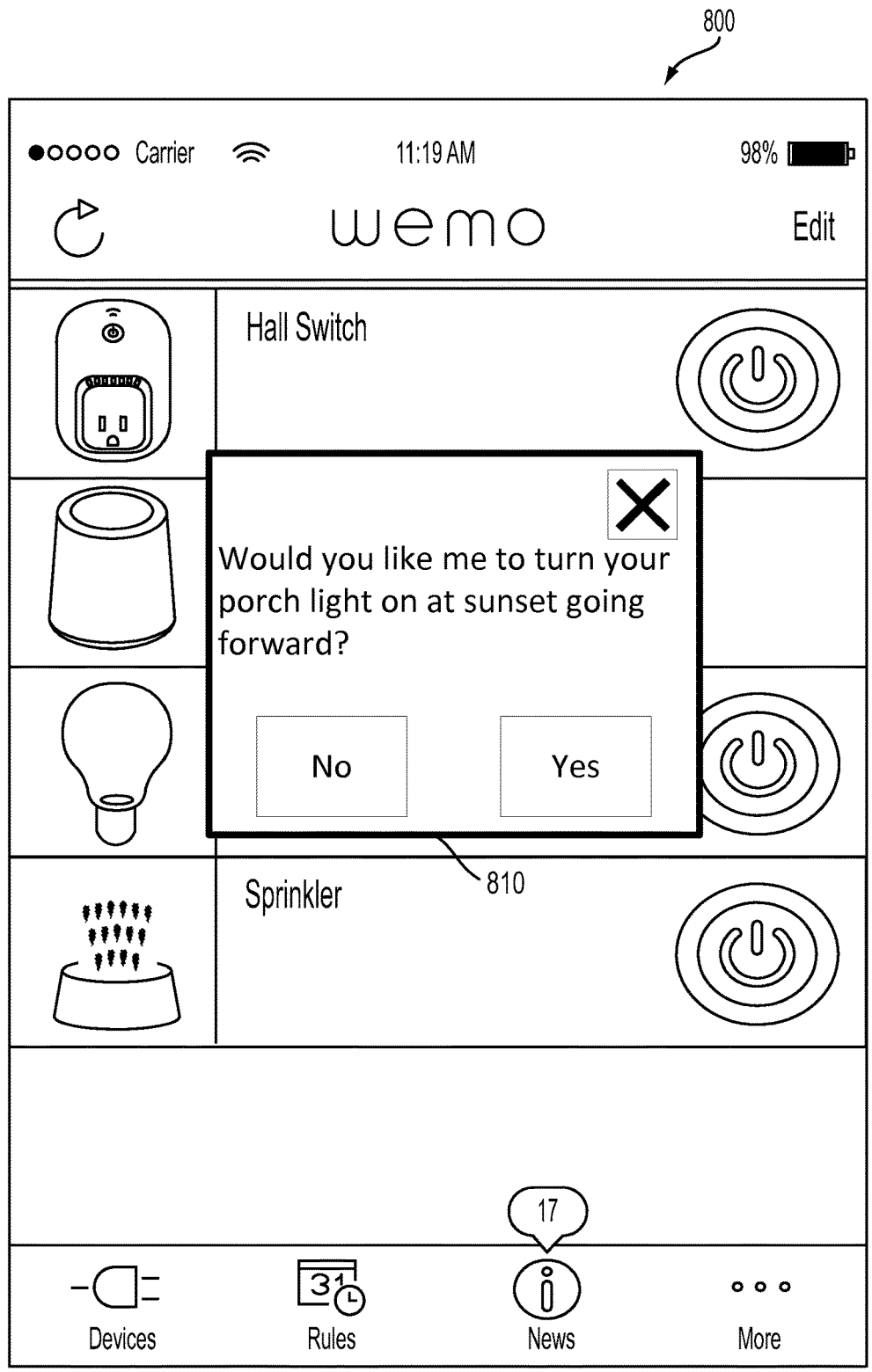
FIGS. 8-12 show example interfaces for providing messages, in accordance with some embodiments.

FIG. 8 shows an example interface 800 for providing an automation request message 810, in accordance with some embodiments. Interface 800 relates to the porch light illustration, and asks the user whether the computing device should turn the porch light on at sunset going forward. In this example, the automation request message 810 includes elements "No" and "Yes" which can be selected by the user to respond to the inquiry. In response to the user selecting "Yes", the computing device can continuously monitor sunset times for the user's location and automatically turn the user's porch light on at sunset going forward. As shown in FIG. 6, upon transitioning from the predictive operational mode 604 to the recommendation operational mode 606, the confidence value 610 can again decrease to some value. In this example, if the user selects "Yes", the confidence value 610 may increase to a threshold value 656 such that the computing device transitions from the recommendation operational mode 606 to the automation operational mode 608. If the user instead selects "No," this can reduce the confidence value 610. In some embodiments, if the confidence value 610 falls below a lower limit, the computing device may revert back to a previous mode such as the observation operational mode 602 where further data is gathered or the predictive operational mode 604 where data is again analyzed and predictions generated and tested.

Figure 10:
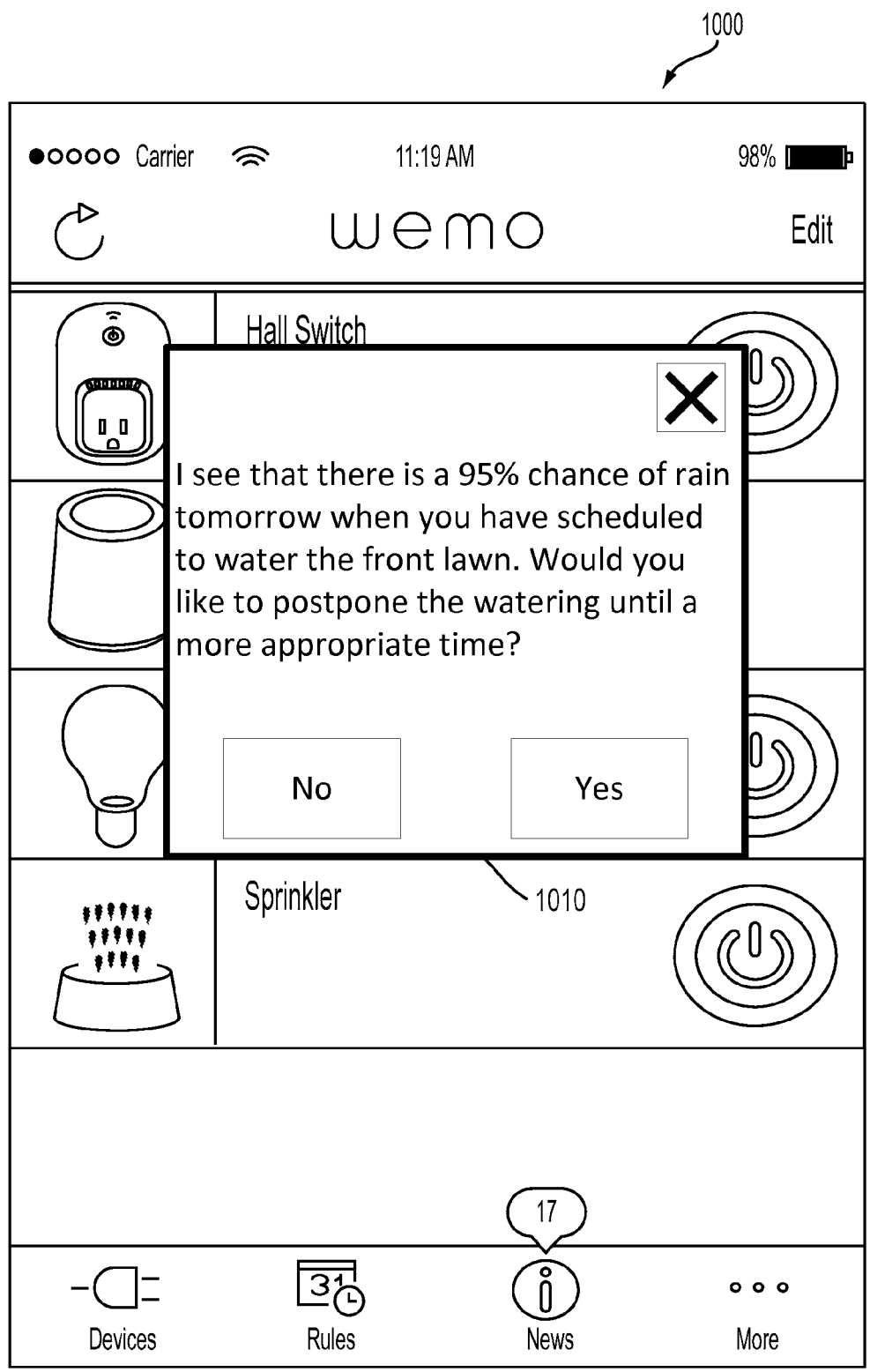
Figure 11:
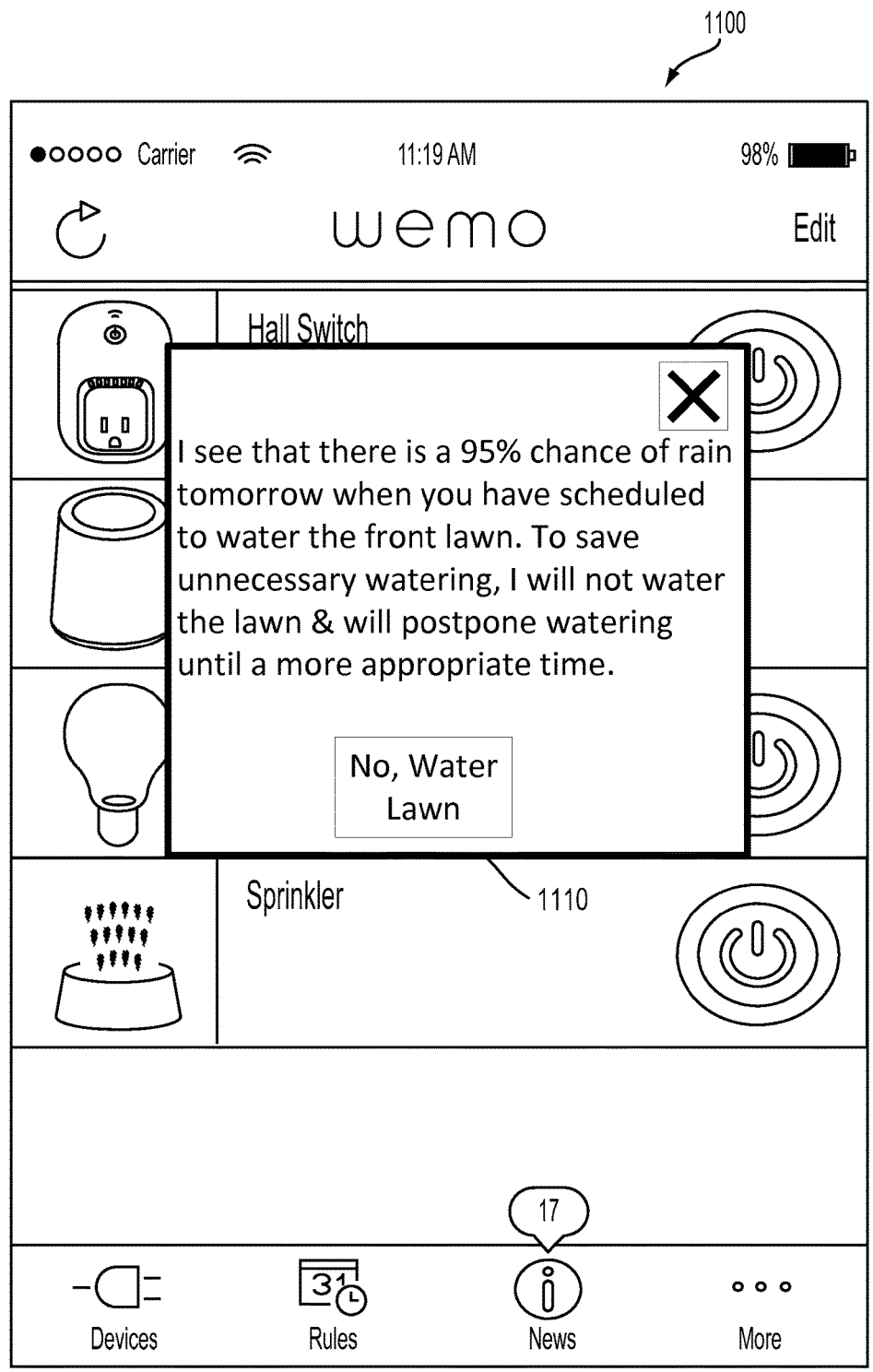

FIGS. 10-11 show other example interfaces 1000, 1100 for providing an automation request message 1010, 1110 in accordance with some embodiments. Interface 1000 relates to the sprinkler illustration, and asks the user whether the computing device should postpone the sprinkler operation until a more appropriate time due to a high probability of rain during the scheduled sprinkler operation. As with the previous example, interface 1010 includes elements "No" and "Yes" which can be selected by the user to respond to the inquiry. In response to the user selecting "Yes", the computing device can cancel the scheduled sprinkler operation and, in some embodiments, can monitor weather patterns to determine a later time to perform the sprinkler operation. In this example, if the user selects "Yes", the confidence value 610 may increase to a threshold value 656 such that the computing device transitions from the recommendation operational mode 606 to the automation operational mode 608. In some embodiments, the threshold value 656 is not reached until the user responds "Yes" to similar inquiries a threshold number of times. If the user instead selects "No," this can reduce the confidence value 610. Interface 1100 also relates to the sprinkler illustration, with the automation request message 1110 indicating that the computing device will cancel the scheduled sprinkler operation unless the user provides instructions to the contrary. In this illustration, if the user selects "No, Water Lawn" the confidence value 610 may decrease as described above. If the user does nothing, the computing device may automatically postpone the sprinkler operation until a more appropriate time. Since the automation request message 1110 in interface 1100 requires user input to prevent the computing device from performing the function of the network device, such a message may be provided in scenarios where the confidence value 610 is above some predetermined value but below the threshold value 656. Further, if the user does not provide input in this scenario, the confidence value 610 may further increase as described above.

Figure 9:
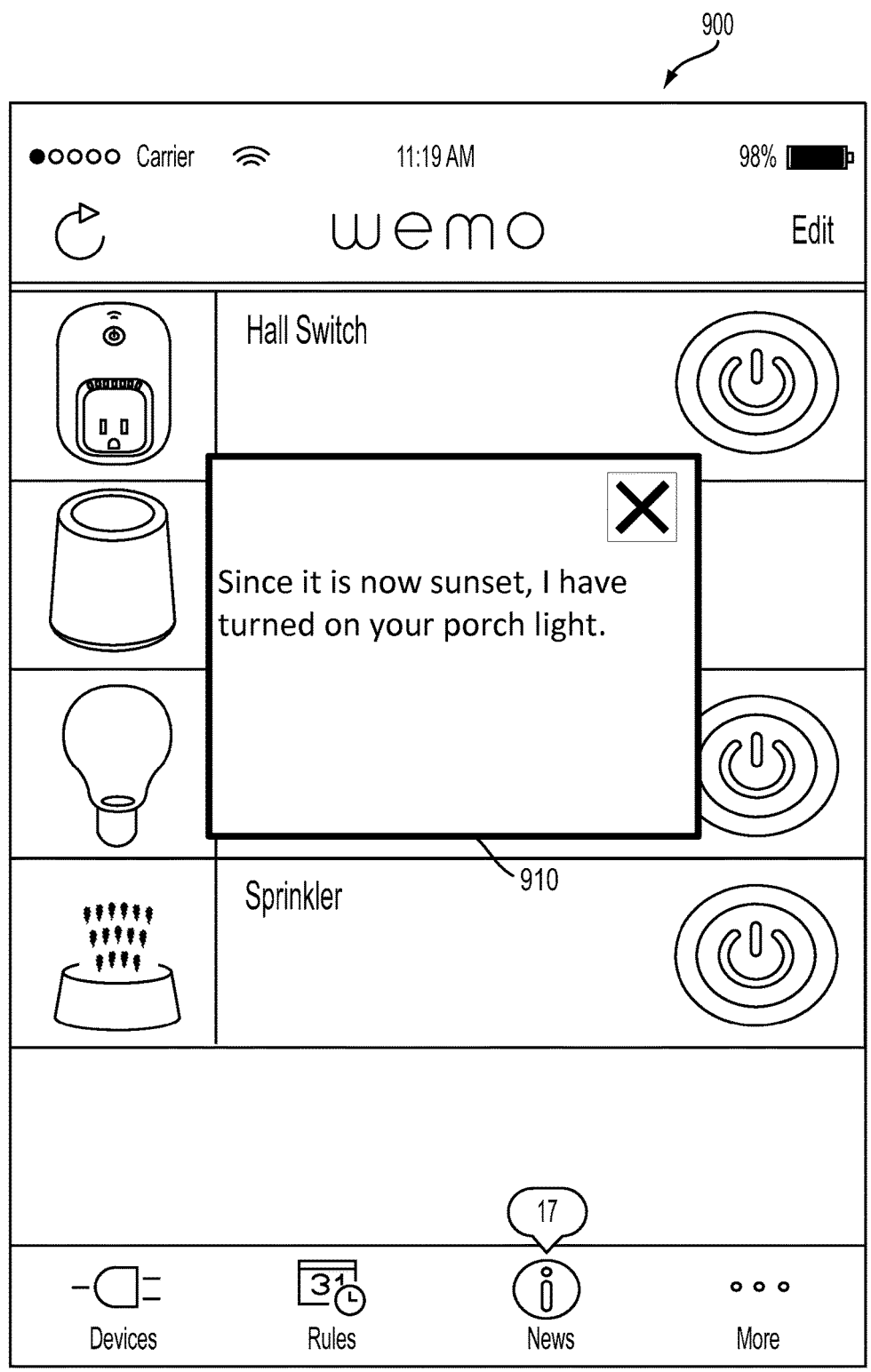
Figure 12:
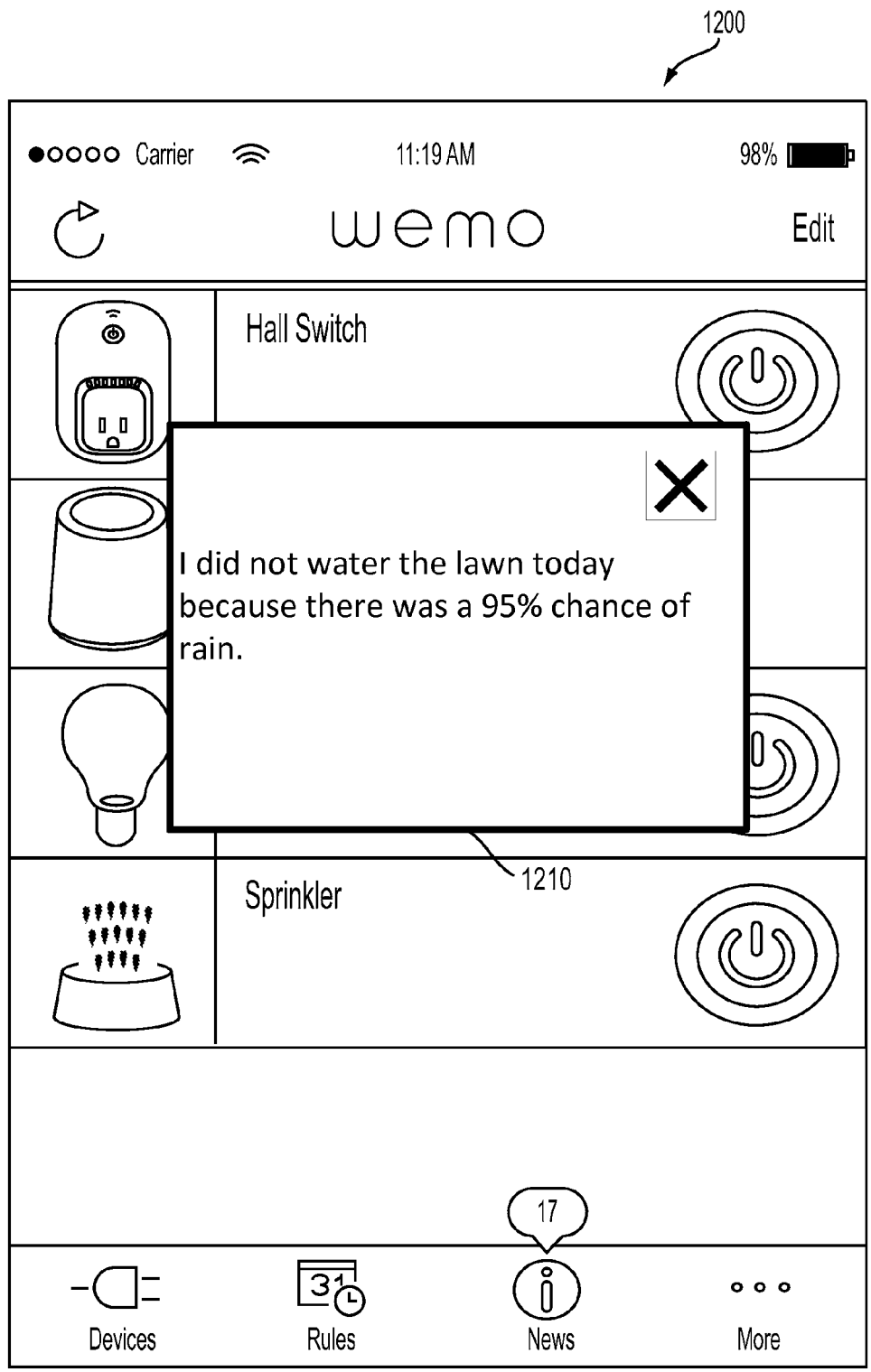

When the confidence value 656 is reached, the computing device may transition from the recommendation operational mode 606 to the automation operational mode 608 where the function of the network device is automatically performed without user input. In the porch light illustration, when the computing device is in the automation operational mode 608, the computing device may automatically turn the user's porch light on at sunset. Similarly, in the sprinkler illustration, the computing device when in the automation operational mode 608 may automatically cancel scheduled sprinkler operations at times when it is raining or when rain is forecasted above some threshold probability. In some embodiments, the user is not notified when such automated functions are performed. In some embodiments, notifications are provided. Examples of such notifications are shown in FIGS. 9 and 12 which illustrate interfaces 910, 1210 including notification messages 910, 1210 that apply to the porch light and sprinkler examples, respectively, and that provide indications that the corresponding functions have been performed automatically.

In some embodiments, some or all of the interaction data 630 received during one or more operational modes can correspond to interactions by other users with their network devices, the other users having some type of relationship or common characteristic with the user of the network device. For example, a "socially crowd sourced" set of data can be collected corresponding to interactions by the user's friends, family members, neighbors, and/or other connections with their own network devices. In some embodiments, when the user's interactions with his or her network device lacks the sample size and/or consistency to make reasonably accurate predictions, such socially crowd-sourced data can be analyzed in conjunction with contextual data to generate and refine the predictive model for the particular user. For example, referring back to the porch light illustration, the user might turn their porch light on most evenings but at various times and with no apparent pattern. In this scenario, upon analyzing the interactions of other similarly situated users with their porch light, a correlation can be identified indicating that one or more of the other users turns on their porch light at sunset. Upon identifying this correlation, the computing device can generate a prediction that the user may desire to turn on their porch light in the future at sunset, and may provide a suggestion or recommendation to the user regarding whether they wish for their porch light to be automatically turned on at sunset. Similarly, in the sprinkler illustration, the user may not ever manually override scheduled watering operations when rain is forecasted but other similarly situated users may in fact do so. In this scenario, and upon identifying this correlation, the particular user can be provided with a suggestion or recommendation asking the user whether they wish for a scheduled watering to be canceled due to chance of rain.

As illustrated in FIG. 6 and described above with regard to process 600, a confidence value 610 can be calculated and compared against a threshold value 652, 654, 656 to determine whether the computing device is to transition from one operational mode to the next. In some embodiments, as illustrated in FIG. 6, the confidence value 610 can decrease to some predetermined value as the computing device transitions from one operational mode to the next. In some embodiments, the confidence value 610 can instead gradually increase from the initial observation operational mode 602 to the predictive operational mode 604 and so forth. As an illustration, threshold value 652 may correspond to a confidence value of 90%, threshold value 654 can correspond to a confidence value of 95%, and threshold value 656 can correspond to a confidence value of 98%. This illustration is not intended to be limiting, as any suitable threshold confidence values can be utilized in accordance with various embodiments of the invention. In some embodiments, a threshold value can vary depending on the sensitivity and/or security considerations for the particular network device operation. For example, locking/unlocking a door may require a very high level of confidence in which case the threshold value can be very high. In contrast, turning a light off in a bathroom may be considered much less "sensitive" and thus may not require as much security and reliability as the door lock, thereby warranting a lower threshold value in some embodiments.

As described herein, network device functions can be automated in a sequential process such that the transition from manual operation of a network device by the user to automated operation by the computing device can occur gradually, thereby allowing users to gain trust in the system. Moreover, assumptions about the user and other parameters can be dynamically modified to account for changes in user behavior with respect to their network device. As shown in FIG. 6, in some embodiments, the computing device can continue to receive interaction data 630 and contextual data 640 throughout the various operational modes. This data can be analyzed 620 to identify changes in user behavior over time. These considerations in combination with the continuously updated confidence value 610 (which can be interrelated) may allow for recommendations and network device automation to be closely aligned with the needs and behaviors of the user.

In some embodiments, during a setup process, a user can be prompted to provide information indicating a "trust" level in the automation processes such as those described above with regard to FIG. 6, since users may have varying degrees of trust in the system performing network device functions automatically without their input. If a user indicates that their trust level is low, this may result in higher confidence threshold values being established that must be reached for the system to transition from one operational state to the next. If a user instead indicates a high level of trust, this may result in lower confidence threshold values being established. In some embodiments, the number of observations required for transition from one operational mode to another can be adjusted as well based on the user's trust level.

As an illustration, to transition from the predictive operational mode 604 to the recommendation operational mode 606, the confidence value may need to reach a default threshold (e.g., 90%) after a default number of times (e.g., 100) a particular prediction is tested in response to a correlated context being observed. These default values may, for example, correspond to a user that has indicated a low trust level during a setup process. Alternatively, if the user indicates a high trust level, the default values can be made less stringent (e.g., 75% confidence after 50 tested observations). Thus confidence values and/or the required number of observations can be modified based on the trust level a particular user. In some embodiments, users can be periodically prompted to provide a current trust level. In some embodiments, a user's trust level associated with automation of a particular network device can be considered in assigning confidence value and observation number thresholds to other network devices in the user's network. In some embodiments, default values can be based upon interactions by other users with their network devices in other networks. For example, by generating predictions with regard to the interactions of users with their network devices, testing these predictions, and gradually transitioning such users through the various operational modes illustrated in FIG. 6, default threshold values can be established for other users in other networks.

Figure 7:
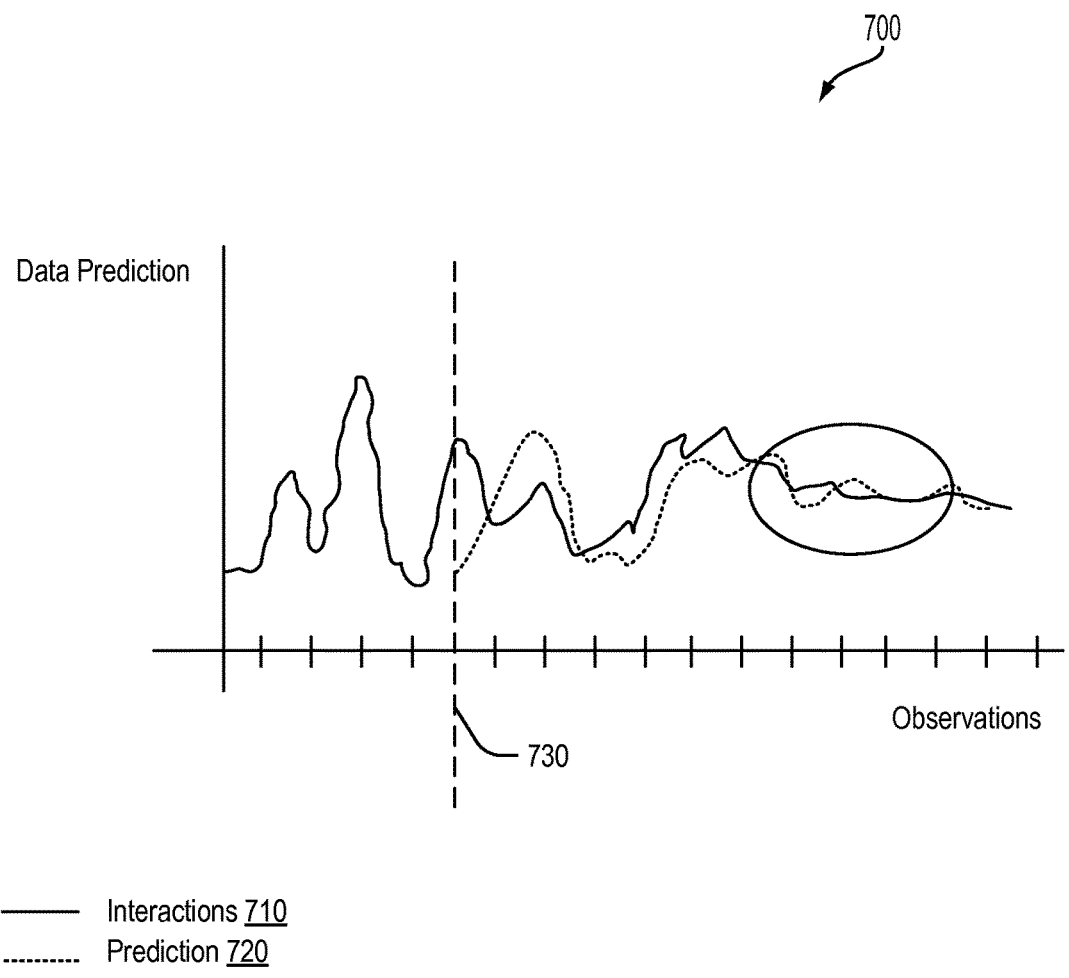
FIG. 7 shows a process for testing a prediction including a correlation between an interaction with a network device and a context, in accordance with some embodiments.

FIG. 7 shows a process 700 for testing a prediction including a correlation between an interaction with a network device and a context, in accordance with some embodiments. As illustrated, in process 700, interactions 710 can be detected up until a point in time 730 (e.g., after a threshold number of observations) at which a prediction is generated and tested. Over time, as described herein, a the predictive model corresponding to a particular user's interactions with one or more of their network devices can be modified to more closely mirror the user's behavior and needs. Thus, as illustrated in FIG. 7, the predicted interactions 720 by the user gradually converge with the actual detected interactions 710. However, in some embodiments, there can be unexpected interactions that are inconsistent with the predicted interactions, as illustrated in the circled region in FIG. 7. Such scenarios may suggest that additional information is needed from the user to refine the predictive model and thus provide more accurate predictions. In such embodiments, a message can be transmitted to the user (e.g., displayed in an interface of the user's access device). The message may ask the user whether the unexpected interaction was an anomaly that is unlikely to occur in the future and/or may request other information from the user to better understand the cause of the reasons for the unexpected interactions.

In some embodiments, there may be scenarios where the threshold confidence value for transitioning from one operational mode to the next is not reached after a large number of observations. Similarly, a scenario can occur where a threshold confidence value is reached but the threshold number of observations is not. In such embodiments, a message can be transmitted to the user (e.g., displayed in an interface of the user's access device). The message may ask the user for information that can be used to determine whether to modify the threshold confidence value and/or threshold number of observations. For example, if a threshold confidence value of 98% is reached but only 200 observations have occurred where the threshold number of observations is 250, the user may be asked to confirm if the corresponding prediction is accurate such that the user wants to transition to the next operational mode. If the user responds affirmatively, the threshold number of observations can be modified and a transition to the next operational mode can be initiated. Such direct interactions with the user can also be used to adjust threshold confidence values and/or threshold numbers of observations corresponding to other transitions between other operational modes, and corresponding to predictions associated with the user's interactions with other network devices.

Accordingly, as described herein, a predictive model can be modified over time based on a number of different factors including, but not limited to, indirect information about the user gleaned from generating and testing predictions in response to identifying correlations between user interactions and various contexts, direct interaction with the user such as prompting the user for information and analyzing responses received from the user, and information about other user's interactions with other network devices in different networks.

Figure 13:
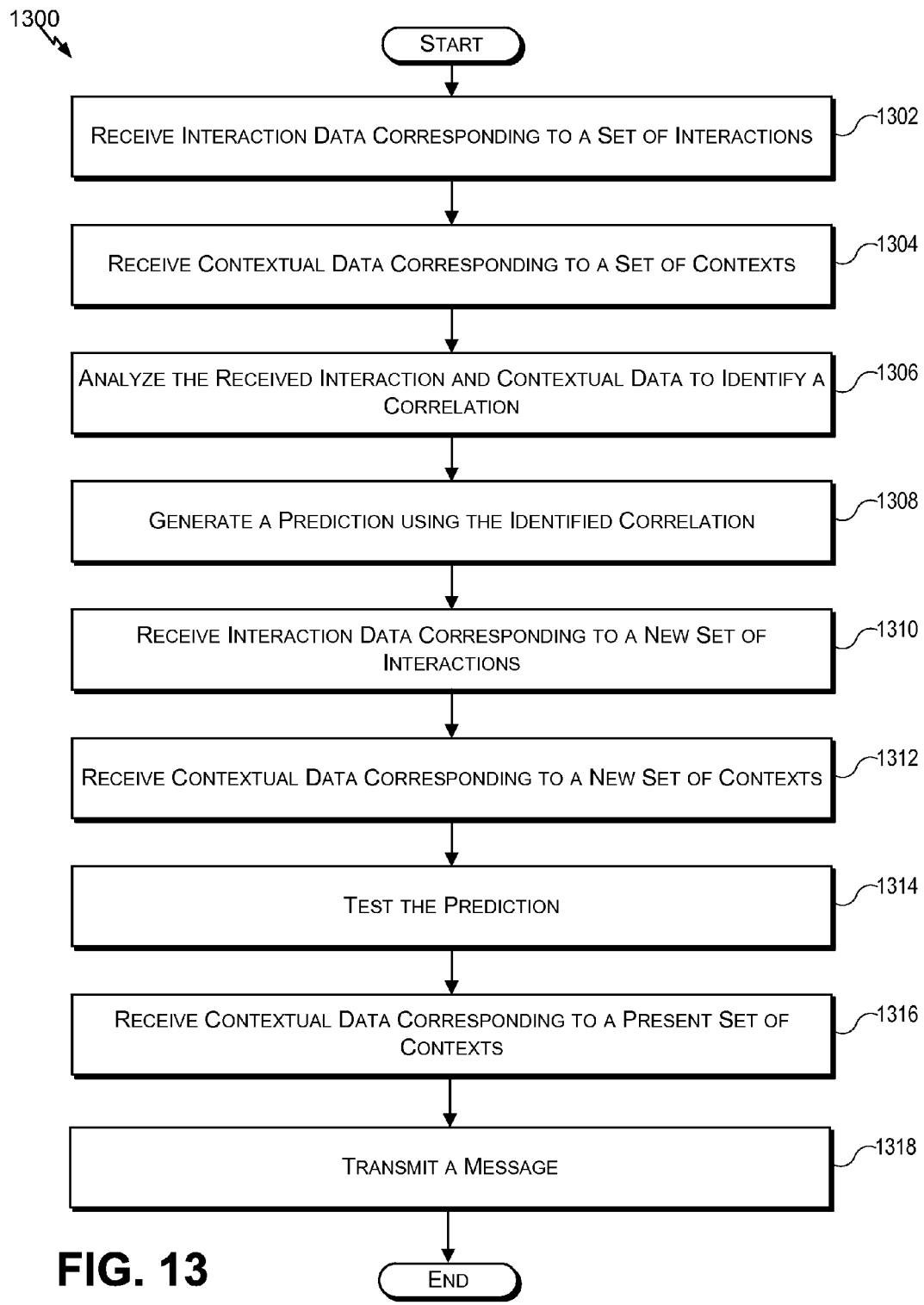
FIG. 13 shows a flowchart illustrating a method of providing predictive modeling based on interactions with a network device, in accordance with some embodiments.

FIG. 13 shows a flowchart illustrating a method 1300 of providing predictive modeling based on interactions with a network device, in accordance with some embodiments. The method 1300 can be implemented by any suitable computing device including a cloud-based device, a network device, a gateway, a user device (e.g., an access device), or combinations thereof.

Method 1300 is illustrated as a logical flow diagram, the operation of which represents operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, applications, objects, components, data structures, and the like that perform particular functions or implement particular data types. The order in which the operations are described is not intended to be construed as a limitation, and any number of the described operations can be combined in any order and/or in parallel to implement the processes.

Additionally, the method 1300 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

At 1302, the method 1300 can include receiving interaction data corresponding to a set of interactions. The interactions may be associated with functions performed by the network device. In some embodiments, the interaction data can represent a user's interaction with the network device, such as a change of state of the network device, creation of a new rule assigned to the network device, deletion or modification of an existing rule assigned to the network device, overriding an existing rule assigned to the network device, or any other suitable interaction between the user and the network device. The interaction data can be provided by any suitable source including, for example, the network device, a gateway, and access device, and the like.

At 1304, contextual data corresponding to a set of context can be received. The contextual data can be received from a source other than the source of the interaction data. For example, in some embodiments, the contextual data can be received from a remote server, a webpage, or any other data source external to the network in which the network device resides. In some embodiments, the contextual data can include interactions, changes of state, and/or measurements associated with other network devices. In such embodiments, the other network devices can be part of the same network within which the network device is located and/or part of other networks associated with other users. In some embodiments, the other network devices can include one or more sensors.

In some embodiments, an observation operational mode can be initiated at the computing device. In such embodiments, the interaction data and contextual data received by the computing device at 1302 and 1304 can be received while the computing device is operating in the observation operational mode.

At 1306, the method 1300 can include analyzing the received interaction data and contextual data. The analysis can include identifying a correlation between a context in the received contextual data and an interaction associated with a function performed by the network device. At 1308, a prediction can be generated using the identified correlation. In some embodiments, a predictive operational mode can be initiated at the computing device, such that the analysis of the received interaction data and contextual data at 1306 occurs while the computing device is in the predictive operational mode. In some embodiments, the prediction generated using the identified correlation at 1308 can also occur while the computing device is in the predictive operational mode.

At 1310, interaction data corresponding to a new set of interactions can be received and, at 1312, contextual data corresponding to a new set of contexts can be received. The new set of contexts can include the context correlated with the interaction associated with the function performed by the network device. At 1314, the generated prediction can be tested. The testing can include determining whether the network device performed the function when the correlated context occurred.

At 1316, contextual data corresponding to a present set of context can be received. The present set of contexts can include the context correlated with the interaction associated with the function performed by the network device.

At 1318, a message can be transmitted. The message can include an automation request corresponding to the function performed by the network device. In some embodiments, the automation request includes a request to automate the function performed by the network device. In some embodiments, the method 1300 can further include detecting input corresponding to an authorization to automate the function performed by the network device. In some embodiments, the message can indicate that the function will be automated unless input is detected. In some embodiments, a recommendation operational mode can be initiated at the computing device, such that the message including the automation request is transmitted at 1318 while the computing device is in the recommendation operational mode.

In some embodiments, an automation operational mode can be initiated at the computing device, such that the automation operational mode causes the function to be performed automatically by the network device when the correlated context occurs.

In some embodiments, the method 1300 can include initiating a plurality of operational modes sequentially at the computing device. In such embodiments, as an example, an observation operational mode, a predictive operational mode, a recommendation operational mode, and an automation operational mode can be initiated at the computing device sequentially. As described above, a confidence value can be continuously calculated and updated. When a threshold confidence value associated with a present operational mode is reached, the computing device may transition from the present operational mode to a different operational mode. In some embodiments, when a lower limit of the confidence value is reached, in some embodiments, the computing device can revert back to a previous operational mode.

It will be appreciated that method 1300 is illustrative and that variations and modifications are possible. Steps described as sequential may be executed in parallel, order of steps may be varied, and steps may be modified, combined, added, or omitted. Method 1300 can be performed for each network device that is determined to be connected to the network. It should be noted that method 1300 can be performed concurrently for other network devices that are determined to be connected to the network. Method 1300 can be performed for any number of functions performed by a network device.

Figure 5:
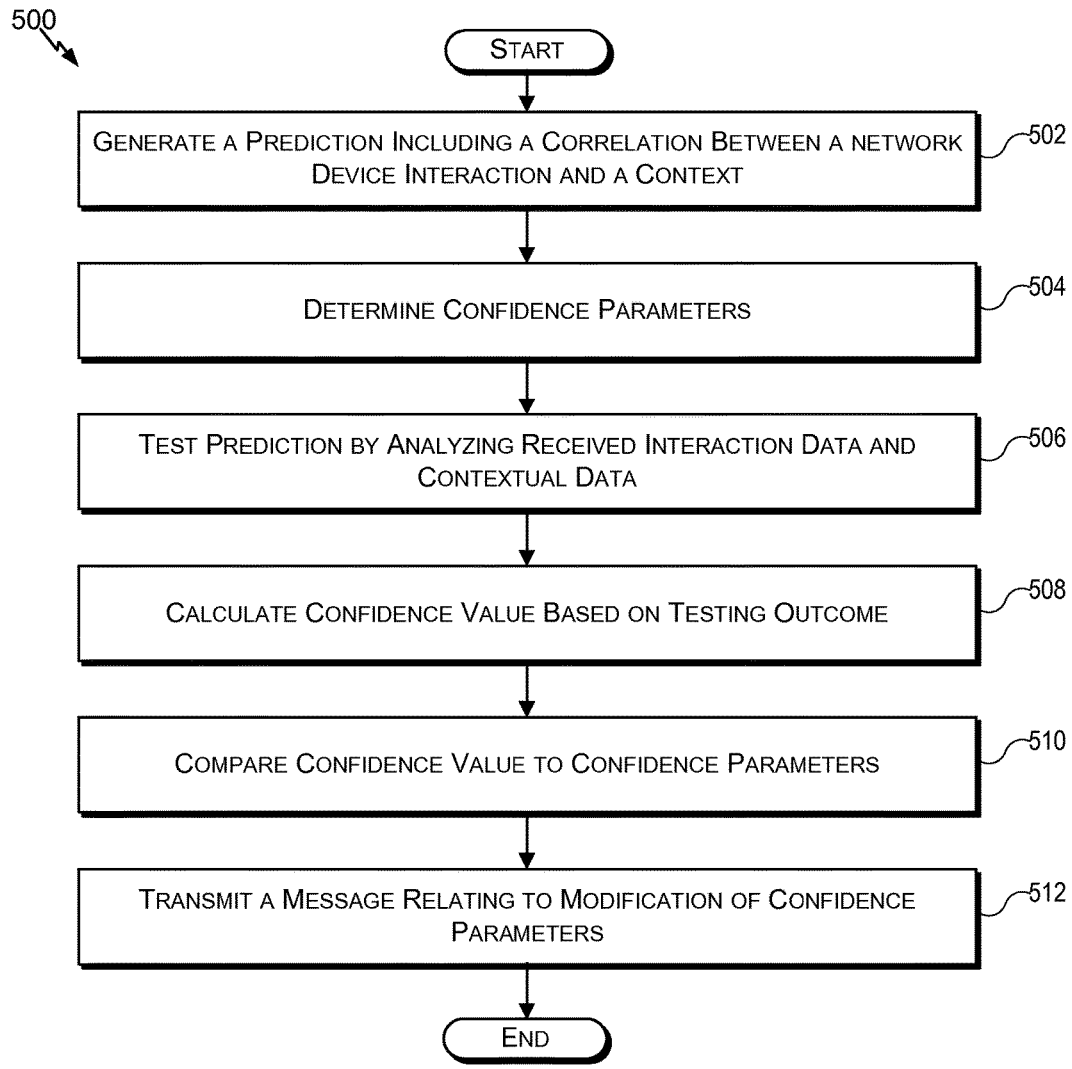
FIG. 5 shows a flowchart illustrating a method of providing predictive modeling based on interactions with a network device, in accordance with some embodiments.

FIG. 5 shows a flowchart illustrating a method 500 of providing predictive modeling based on interactions with a network device, in accordance with some embodiments. The method 500 can be implemented by any suitable computing device including a cloud-based device, a network device, a gateway, a user device (e.g., an access device), or combinations thereof.

Method 500 is illustrated as a logical flow diagram, the operation of which represents operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, applications, objects, components, data structures, and the like that perform particular functions or implement particular data types. The order in which the operations are described is not intended to be construed as a limitation, and any number of the described operations can be combined in any order and/or in parallel to implement the processes.

Additionally, the method 500 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

At 502, the method 500 can include generating a prediction including a correlation between an interaction with a network device and a context. The interaction can be associated with a function performed by the network device. In some embodiments, the interaction can include a change of state of the network device, creation of a new rule assigned to the network device, deletion or modification of an existing rule assigned to the network device, overriding an existing rule assigned to the network device, or any other suitable interaction between the user and the network device.

At 504, confidence parameters associated with the prediction can be determined. In some embodiments, the confidence parameters can include a threshold confidence value and a threshold number of observations. The observations can correspond to the correlated context occurring. As described herein, such confidence parameters can include default values determined based on a trust level of the user.

At 506, the prediction can be tested. Testing can include analyzing received interaction data and contextual data, and analyzing can include determining whether the interaction with the network device occurred in the correlated context. The interaction data can be provided by any suitable source including, for example, the network device, a gateway, and access device, and the like. The contextual data can also be received from any suitable source. In some embodiments, the contextual data can be received from a source other than the source of the interaction data. For example, in some embodiments, the contextual data can be received from a remote server, a webpage, or any other data source external to the network in which the network device resides. In some embodiments, the contextual data can include interactions, changes of state, and/or measurements associated with other network devices. In such embodiments, the other network devices can be part of the same network within which the network device is located and/or part of other networks associated with other users. In some embodiments, the other network devices can include one or more sensors.

At 508, a confidence value can be calculated based on the test outcome and, at 510, the confidence value can be compared to the confidence parameters. In some embodiments, comparing the confidence value to the confidence parameters can include determining whether the confidence value has reached the threshold confidence value and determining whether the threshold number of observations has been reached.

At 512, a message can be transmitted. The message can relate to a modification of the confidence parameters. In some embodiments, the message can be transmitted as part of an initial setup process, e.g., prior to 502-510. As described above, a user can be prompted during an initial setup process to indicate a level of trust in the automation processes described herein. In some embodiments, the user's provided level of trust may determine the default threshold confidence value and/or default number of observations associated with the prediction.

In some embodiments, the message can be transmitted in response to determining that the confidence value has not reached the threshold confidence value. In some embodiments, the message can be transmitted in response in response to determining that the confidence value has been reached, but that the threshold number of observations has not been reached. In some embodiments, method 500 can further include receiving input corresponding to an instruction to modify the confidence parameters and modifying the confidence parameters. For example, as described herein, the user can be prompted for further information in response to unexpected interactions being detected, a threshold confidence value not being reached, and/or a threshold number of observations not being reached. Based on information provided by way of such direct interaction with the user, confidence parameters can be modified and the prediction further refined. In some embodiments, modifying the confidence parameters can include transitioning from an initial operational mode to a new operational mode. In some embodiments, the message can further relate to a modification of confidence parameters associated with a different prediction, wherein the different prediction includes a correlation between an interaction with a different network device and a different context.

It will be appreciated that method 500 is illustrative and that variations and modifications are possible. Steps described as sequential may be executed in parallel, order of steps may be varied, and steps may be modified, combined, added, or omitted. Method 500 can be performed for each network device that is determined to be connected to the network. It should be noted that method 500 can be performed concurrently for other network devices that are determined to be connected to the network. Method 500 can be performed for any number of functions performed by a network device.

Figure 14:
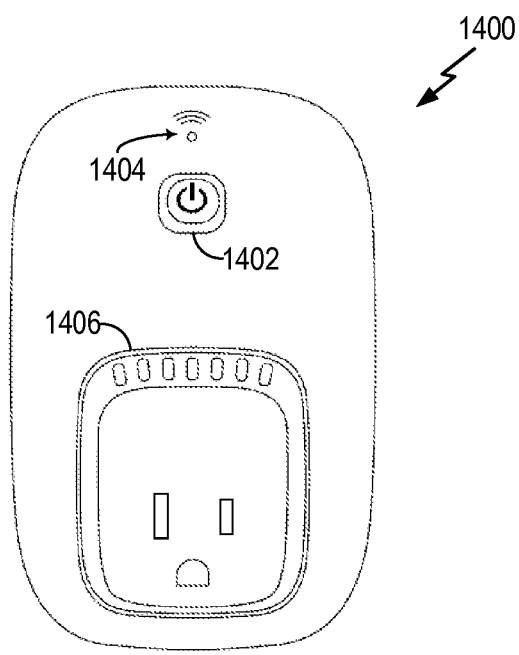
FIG. 14 shows a front view of an example network device, in accordance with some embodiments.
Figure 15:
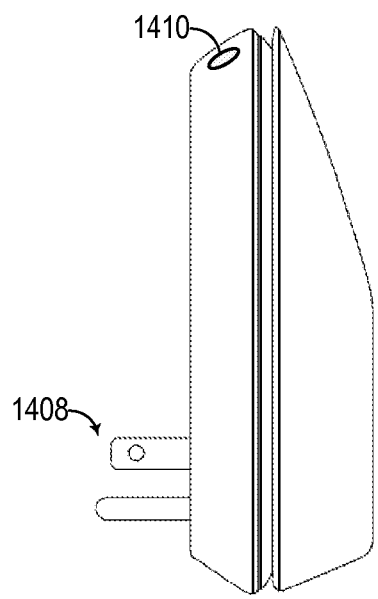
FIG. 15 shows a side view of an example network device, in accordance with some embodiments.

FIG. 14 shows a front view of an example network device 1400 and FIG. 15 shows a side view of the example network device 1400, in accordance with some embodiments. The network device may be any of the network devices described herein. In some embodiments, the network device 1400 may be a home automation network device. For example, the network device 1400 may include a home automation switch that may be coupled with a home appliance. A user may wirelessly access the network device 1400 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 1400 may include a WiFi enabled switch that connects home appliances and other electronic devices to a compatible 802.11b/g/n WiFi network. The network device 1400 may thus allow users to locally or remotely turn devices on or off from anywhere, program customized messages, and/or change device status. The network device 1400 may further allow a user to create custom schedules or have devices respond to sunrise or sunset.

The network device 1400 includes an power button 1402 that may be depressed in order to turn the network device 1400 on and off. In some embodiments, a light source may be integrated with or located behind the power switch. For example, a light-emitting diode (LED) may be located on a circuit board under the power button 1402. The light source may be illuminated when the network device 1400 is powered on, and may not be illuminated when the network device 1400 is powered off.

The network device 1400 further includes a communications signal indicator 1404. The signal indicator 1404 may indicate whether the network device 1400 has access to a communications signal, such as a WiFi signal. For example, the signal indicator 1404 may include a light source (e.g., a LED) that illuminates when the network device 1400 is connected to a communications signal. The light source may depict different colors or other characteristics (e.g., flashing, dimming, or the like) to indicate different levels of signal strength or mode of operation.

The network device 1400 includes a restore button 1410. The restore button 1410 may allow a user to reset the network device 1400 to factory default settings. For example, upon being depressed, the restore button 1410, as shown in FIG. 15, may cause all software on the device to be reset to the settings that the network device 1400 included when purchased from the manufacturer.

The network device 1400 further includes a plug 1408 and an outlet 1406. The plug 1408 allows the network device 1400 to be plugged into a wall socket, such as a socket providing 120V, 220V, or the like. In turn, an appliance may be plugged into the outlet 1406. Once the network device 1400 is registered according to the techniques described above, an appliance plugged into the socket may be controlled by a user using an access device (e.g., access device 108).

Figure 16:
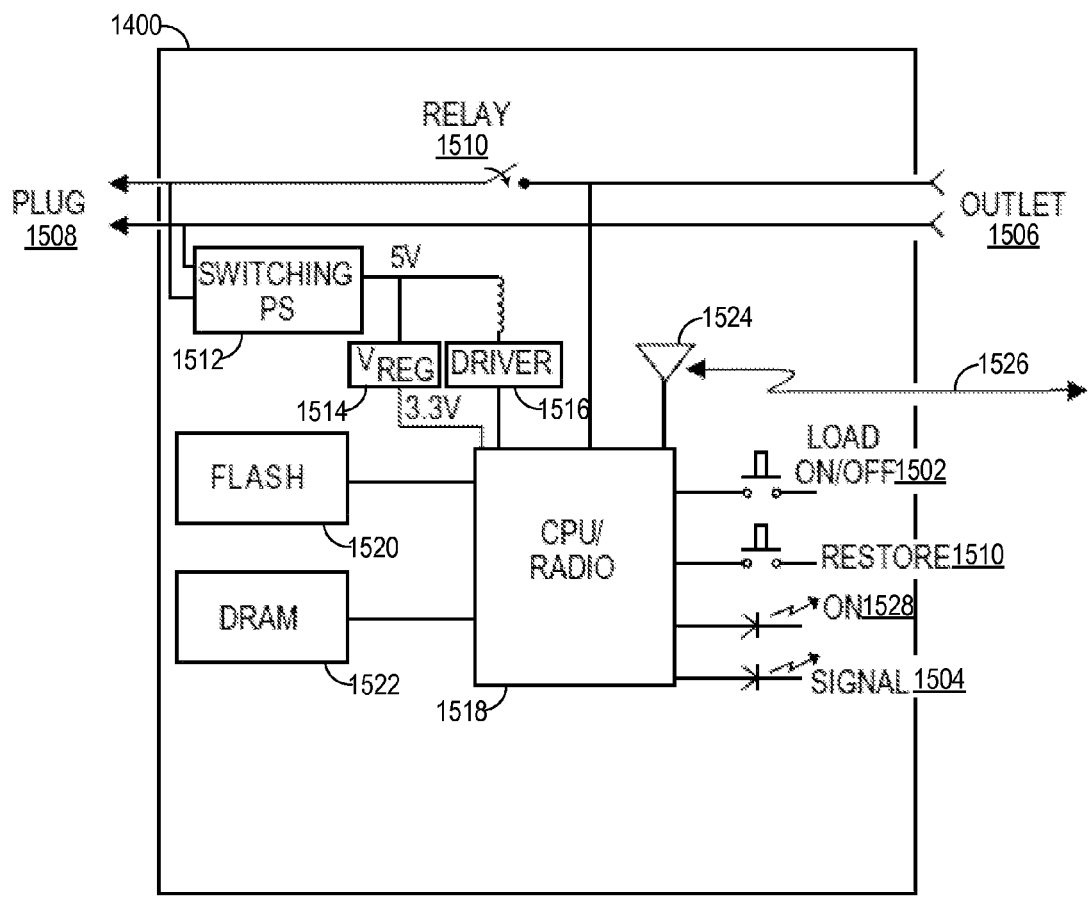
FIG. 16 shows a block diagram of an example network device, in accordance with some embodiments.

FIG. 16 shows a block diagram of the example network device 1400, in accordance with some embodiments, depicting different hardware and/or software components of the network device 1400. As described above with respect to FIGS. 14-15, the network device 1400 includes the outlet 1406, the plug 1408, the power button 1402, the restore button 1410, and the communications signal indicator 1404. The network device 1400 also includes light source 1528 associated with the power button 1402. As previously described, the light source 1528 may be illuminated when the network device 1400 is powered on.

The network device 1400 further includes a relay 1510. The relay 1510 is a switch that controls whether power is relayed from the plug 1408 to the outlet 1406. The relay 1510 may be controlled either manually using the power button 1402 or remotes using wireless communication signals. For example, when the power button 1402 is in an ON position, the relay 1510 may be closed so that power is relayed from the plug 1408 to the outlet 1406. When the power button 1402 is in an OFF position, the relay 1510 may be opened so that current is unable to flow from the plug 1408 to the outlet 1406. As another example, an application or program running on an access device may transmit a signal that causes the relay 1510 to be opened or closed. For instance, a mobile application may display a graphical interface on the access device that includes a power button. The user may tap or otherwise select the power button, and the mobile application may send a communication signal (e.g., over a WiFi network) to the network device 1400 instructing the network device 1400 to open or close the relay 1510.

The network device 1400 further includes flash memory 1520 and dynamic random access memory (DRAM) 1522. The flash memory 1520 may be used to store instructions or code relating to an operating system, one or more applications, and any firmware. The flash memory 1520 may include nonvolatile memory so that any firmware or other program can be can updated. In the event the network device 1400 loses power, information stored in the flash memory 1520 may be retained. The DRAM 1522 may store various other types of information needed to run the network device 1400, such as all runtime instructions or code.

The network device 1400 further includes a CPU/Radio 1518. The CPU/Radio 1518 controls the operations of the network device 1400. For example, the CPU/Radio 1518 may execute various applications or programs stored in the flash memory 1520 and/or the dynamic random access memory (DRAM) 1522. The CPU/Radio 1518 may also receive input from the various hardware and software components, interpret the input, and perform one or more functions in response to the input. As one example, the CPU/Radio 1518 may determine whether the power button 1402 has been pressed, and determines whether the relay 1510 needs to be opened or closed. The CPU/Radio 1518 may further perform all communications functions in order to allow the network device 1400 to communicate with other network devices, one or more gateways, a cloud network, and/or one or more access devices. While the CPU and radio of the network device 1400 are shown to be combined in the CPU/Radio 1518, one of ordinary skill in the art will appreciate that, in some embodiments, the CPU and radio may be separately located within the network device 1400. For example, CPU circuitry may be situated at a separate location on a circuit board from the location of radio circuitry, the CPU circuitry may be located on a different circuit board from the radio circuitry, or the like.

The network device 1400 may communicate with other devices and/or networks via antenna 1524. For example, antenna 1524 may include a 2.4 GHz antenna that can transmit and receive WiFi communications signals. The antenna 1524 may include other types of antennas that can communicate Bluetooth® signals, Zigbee® signals, Ultra-Wideband (UWB) signals, and/or the like. In some embodiments, the network device 1400 may include multiple antennas for communicating different types of communication signals.

The network device 1400 further includes a driver 1516, a switching power supply 1512, and a voltage regulator 1514. The driver 1516 may include instructions or code that can be used to translate control signals or commands received from applications running on the DRAM 1522 to commands that the various hardware components in the network device 1400 can understand. In some embodiments, the driver 1516 may include an ambient application running on the DRAM 1522. The switching power supply 1512 may be used to transfer power from the outlet in which the plug 1408 is connected to the various loads of the network device 1400 (e.g., CPU/Radio 1518). The switching power supply 1512 may efficiently convert the voltage and current characteristics of the electrical power to a level that is appropriate for the components of the network device 1400. For example, the switching power supply 1512 may perform AC-DC conversion. In some embodiments, the switching power supply 1512 may be used to control the power that is relayed from the plug 1408 to the outlet 1406. The voltage regulator 1514 may be used to convert the voltage output from the switching power supply 1512 to a lower voltage usable by the CPU/Radio 1518. For example, the voltage regulator 1514 may regulate the DC voltage from 5V to 3.3V.

In various embodiments, functions may be stored as one or more computer-program products, such as instructions or code, in a non-transitory machine-readable storage medium, such as the flash memory 1520 and/or the DRAM 1522. The network device 1400 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 1-13, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 1-13. The memory, such as the flash memory 1520 and/or the DRAM 1522, may be a processor-readable memory and/or a computer-readable memory that stores software code (programming code, instructions, etc.) configured to cause a processor(s) within the CPU/Radio 1518 to perform the functions described. In other embodiments, one or more of the functions described may be performed in hardware.

A set of these instructions and/or code might be stored on a non-transitory machine-readable storage medium, such as the flash memory 1520 and/or the DRAM 1522. In some cases, the storage medium might be incorporated within a computer system, such as the CPU/Radio 1518. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 1400 and/or might take the form of source and/or installable code, which, upon compilation and/or installation on the network device 1400 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

It should be appreciated that the network device 1400 may have other components than those depicted in FIGS. 14, 15, and 16. Further, the embodiment shown in the figures are only one example of a network device that may incorporate an embodiment of the invention. In some other embodiments, network device 1400 may have more or fewer components than shown in the figure, may combine two or more components, or may have a different configuration or arrangement of components.

Figure 17:
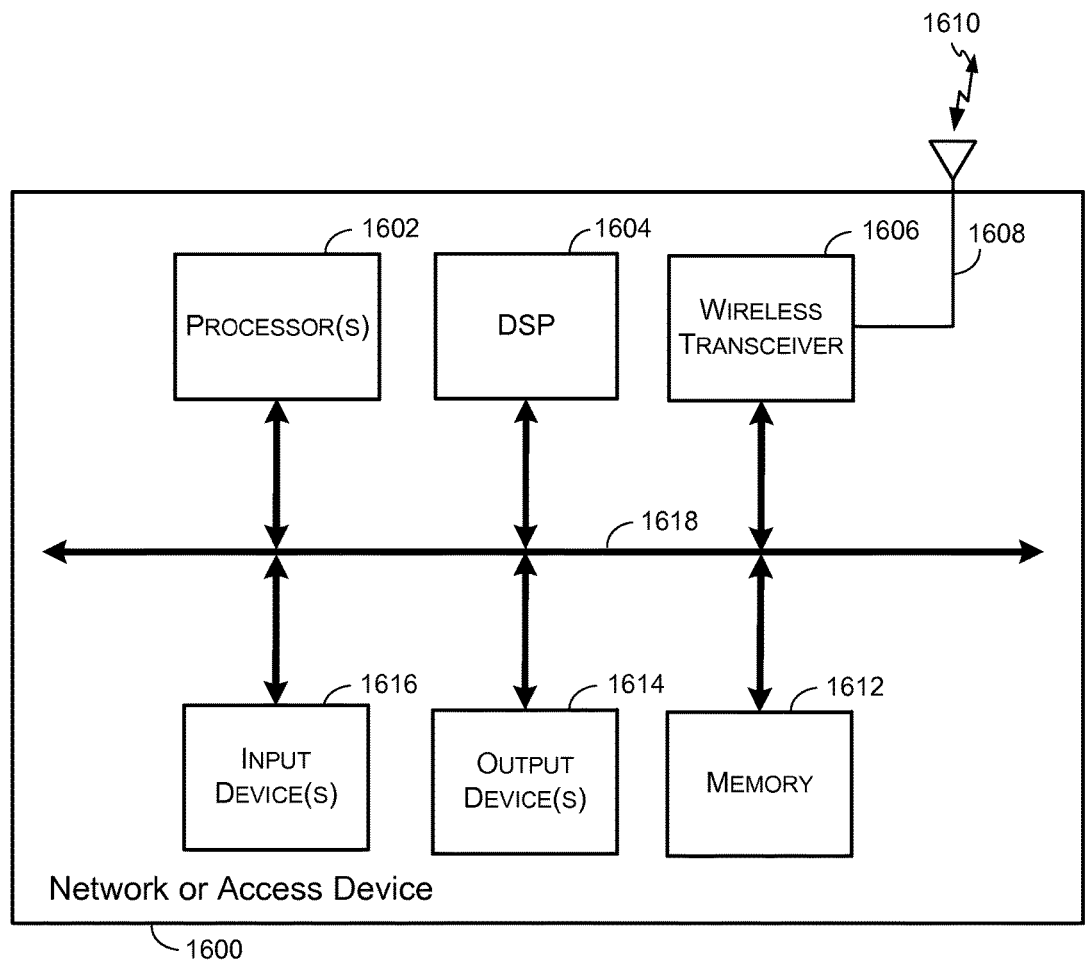
FIG. 17 shows a block diagram of an example network or access device, in accordance with some embodiments.

FIG. 17 shows a block diagram of an example network or access device 1600 (hereinafter "access device"), in accordance with some embodiments. The access device 1600 may include any human-to-machine interface with network connection capability that allows access to a network. For example, the access device 1600 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an internet of things (IoT) device interface (e.g., an Internet enabled appliance such as a wall switch, a control interface, or the like). The access device 1600 includes hardware elements that can be electrically coupled via a bus 1618 (or may otherwise be in communication, as appropriate). In one embodiment, the bus 1618 can be used for the processor(s) 1602 to communicate between cores and/or with the memory 1612. The hardware elements may include one or more processors 1602, including without limitation one or more general-purpose processors and/or one or more special-purpose processors (such as digital signal processing chips, graphics acceleration processors, and/or the like); one or more input devices 1616, which can include without limitation a camera, a mouse, a keyboard, a touch sensitive screen, a touch pad, a keypad, and/or the like; and one or more output devices 1614, which can include, without limitation, a display, a printer, and/or the like.

The access device 1600 may include one or more wireless transceivers 1606 connected to the bus 1618. The wireless transceiver 1606 may be operable to receive a wireless signal 1610 via antenna 1608. The wireless signal 1610 may be transmitted via a wireless network. In some embodiments, the wireless network may be any wireless network such as a wireless local area network (e.g., local area network 100), such as WiFi, a Personal Access Network (PAN), such as Bluetooth® or Zigbee®, or a cellular network (e.g. a GSM, WCDMA, LTE, CDMA2000 network). Wireless transceiver 1606 may be configured to receive various radio frequency (RF) signals 1610 via antenna 1608 from one or more gateways, network devices, cloud networks, and/or the like. Access device 1600 may also be configured to decode and/or decrypt, via the DSP 1604 and/or processor(s) 1602, various signals received from one or more gateways, network devices, cloud networks, and/or the like.

The access device 1600 may further include (and/or be in communication with) one or more non-transitory machine-readable storage mediums or storage devices (e.g., memory 1612), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1612, such as RAM, ROM, FLASH, or disc drive, and executed by processor(s) 1602 or DSP 1604. The access device 1600 can also comprise software elements (e.g., located within the memory 1612), including, for example, an operating system, device drivers, executable libraries, and/or other code, such as one or more application programs, which may comprise computer programs implementing various functions. Memory 1612 may be a non-transitory machine-readable storage medium, processor-readable memory, and/or a computer-readable memory that stores the one or more computer-program products configured to cause the processor(s) 1602 and/or DSP 1604 to perform the various functions. In other embodiments, the various functions described may be performed in hardware.

Figure 18:
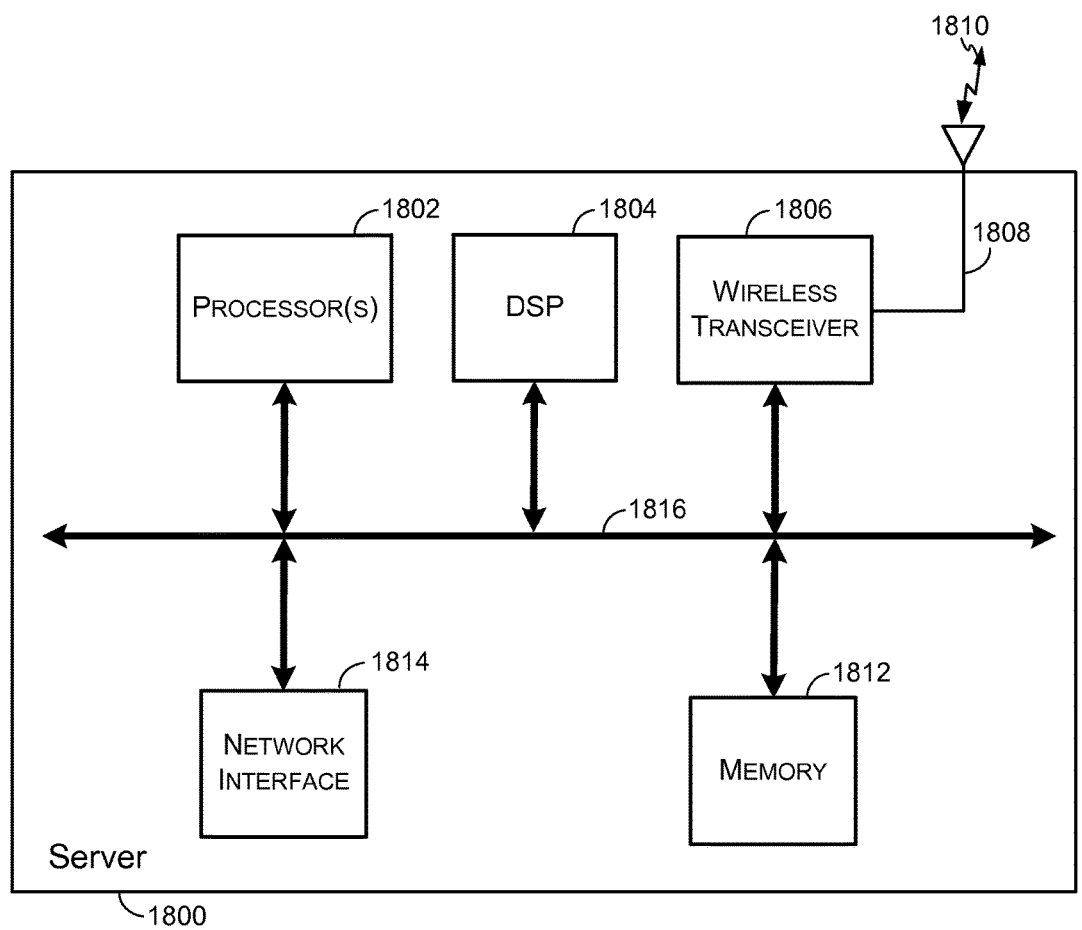
FIG. 18 shows a block diagram of an example server, in accordance with some embodiments.

FIG. 18 shows a block diagram of an example server 1800, in accordance with some embodiments. The server 1800 includes hardware elements that can be electrically coupled via a bus 1816 (or may otherwise be in communication, as appropriate). In one embodiment, the bus 1816 can be used for the processor(s) 1802 to communicate between cores and/or with the memory 1812. The hardware elements may include one or more processors 1802, including without limitation one or more general-purpose processors and/or one or more special-purpose processors (such as digital signal processing chips, graphics acceleration processors, and/or the like), memory 1812, DSP 1804, a wireless transceiver 1806, a bus 1816, and antenna 1808. Furthermore, in addition to the wireless transceiver 1806, server 1800 can further include a network interface 1814 to communicate with a network (e.g., a local area network, a network of a preferred carrier, Internet, etc.).

The server 1800 may further include (and/or be in communication with) one or more non-transitory machine-readable storage mediums or storage devices (e.g., memory 1812), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 1812. The server 1800 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 1-13B, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 1-13. The memory 1812 may be a non-transitory machine-readable storage medium, processor-readable memory, and/or a computer-readable memory that stores the one or more computer-program products configured to cause the processor(s) 1802 to perform the functions described. In other embodiments, one or more of the functions described may be performed in hardware.

A set of these instructions and/or code might be stored on a non-transitory machine-readable storage medium, such as the memory 1812. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the server 1800 and/or might take the form of source and/or installable code, which, upon compilation and/or installation on the server 1800 (e.g., using any of a variety of generally available compilers, installation programs, compression/decompression utilities, etc.) then takes the form of executable code.

Figure 19:
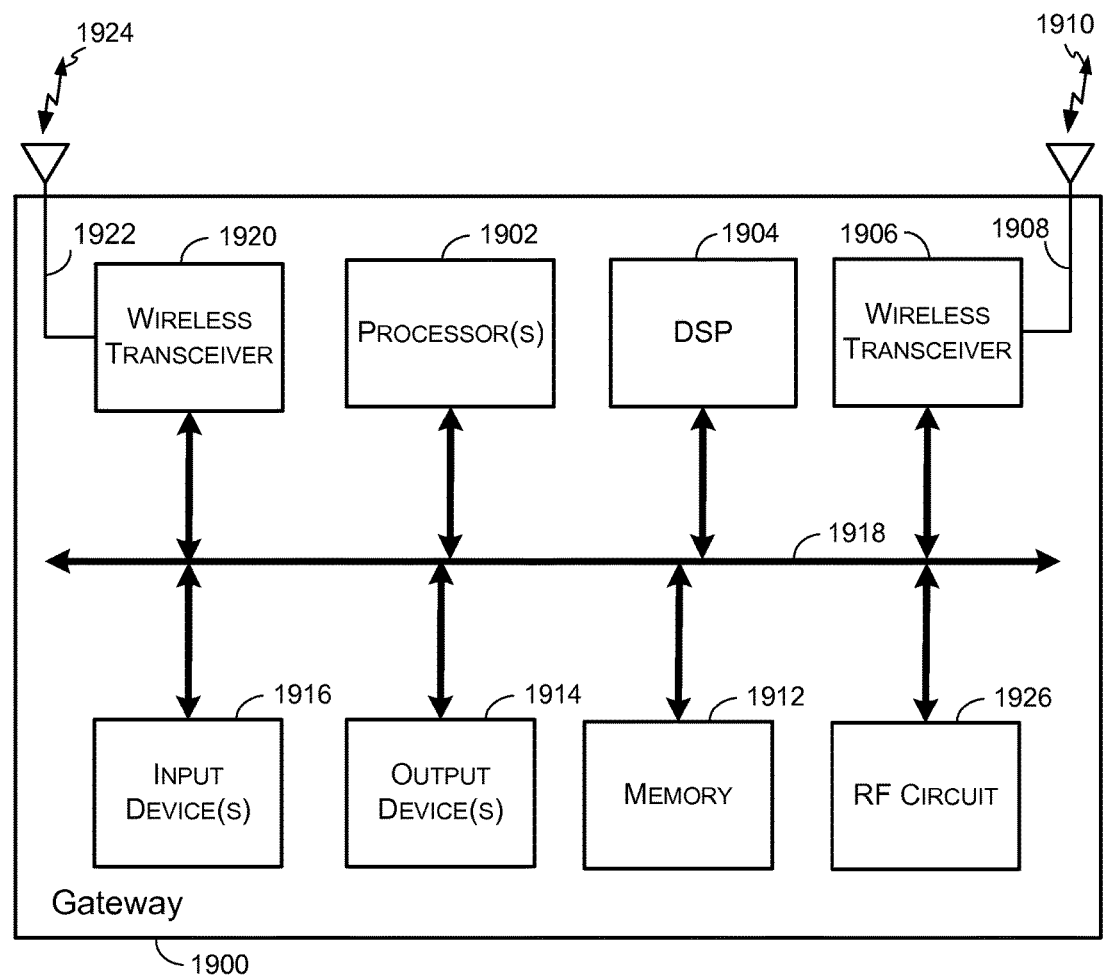
FIG. 19 shows a block diagram of an example of a gateway, in accordance with some embodiments.

FIG. 19 shows a block diagram of an example of a gateway 1900, in accordance with some embodiments. The gateway 1900 may include a range extending device, a router, an access point, a modem, and/or any other device that provides network access among one or more computing devices and/or external networks. For example, the gateway 1900 may include a router gateway with access point and router functionality, and may further include an Ethernet switch and/or a modem. As another example, the gateway 1900 may include a range extending gateway that may be used to improve signal range and strength within a network by taking an existing signal from another gateway (e.g., a router gateway, an access point, or the like) and rebroadcasting the signal to create a second logical network.

The gateway 1900 includes hardware elements that can be electrically coupled via a bus 1918 (or may otherwise be in communication, as appropriate). In one embodiment, the bus 1918 can be used for the processor(s) 1902 to communicate between cores and/or with the memory 1912. The hardware elements may include one or more processors 1902, including without limitation one or more general-purpose processors and/or one or more special-purpose processors (such as digital signal processing chips, graphics acceleration processors, and/or the like); one or more input devices 1916, which can include without limitation one or more buttons, a keyboard, a keypad, a touch sensitive screen, a touch pad, and/or the like; and one or more output devices 1914, which can include, without limitation, a display, light or sound indicators, and/or the like.

The gateway 1900 may include one or more wireless transceivers 1906 and 1920 connected to the bus 1918. The wireless transceiver 1906 may be operable to receive wireless signals (e.g., a wireless signal 1910) via an antenna 1908. The wireless transceivers 1920 may be operable to receive wireless signals (e.g., a wireless signal 1914) via an antenna 1922. The wireless transceivers 1906 and 1920 may each include a WiFi transceiver radio designed to transmit and receive signals using frequencies of a specific frequency band, which may be referred to herein as "WiFi circuits." For example, wireless transceiver 1906 may include a 2.4 GHz WiFi circuit, and wireless transceiver 1920 may include a 5 GHz WiFi circuit. Accordingly, the gateway

1900 may include a single WiFi circuit for a first WiFi frequency band, and a single WiFi circuit for a second WiFi frequency band. In some embodiments, the gateway 1900 may include multiple wireless transceivers (not shown) for each available frequency band. The antennas 1908 and 1922 may include multiple band antennas that can transmit and/or receive signals over different frequency bands.

The gateway 1900 may further include radio frequency (RF) circuit 1926. In some embodiments, the wireless transceivers 1906 and 1920 may be integrated with or coupled to the RF circuit 1926 so that the RF circuit 1926 includes the wireless transceivers 1906 and 1920. In some embodiments, the wireless transceivers 1906 and 1920 and the RF circuit 1926 are separate components. The RF circuit 1926 may include a RF amplifier that may amplify signals received over antennas 1908 and 1922. The RF circuit 1926 may also include a power controller that may be used to adjust signal amplification by the RF amplifier. The power controller may be implemented using hardware, firmware, software, or any combination thereof.

The wireless signals 1910 and 1924 may be transmitted via a wireless network. In some embodiments, the wireless network may be any wireless network such as a wireless local area network (e.g., local area network 100), such as WiFi™, a Personal Access Network (PAN), such as Bluetooth® or Zigbee®, or a cellular network (e.g. a GSM, WCDMA, LTE, CDMA2000 network). Wireless transceivers 1906 and 1920 may be configured to receive various radio frequency (RF) signals (e.g., signals 1910 and 1924) via antennas 1908 and 1924, respectively, from one or more other gateways, access devices, network devices, cloud networks, and/or the like. Gateway 1900 may also be configured to decode and/or decrypt, via the DSP 1904 and/or processor(s) 1902, various signals received from one or more gateways, network devices, cloud networks, and/or the like.

The gateway 1900 may include a power supply (not shown) that can power the various components of the gateway 1900. The power supply may include a switch-mode power supply, a linear power supply, a push-pull power supply, or any other suitable type of power supply. In some embodiments, the gateway 1900 may include multiple power supplies. For example, a switch-mode power supply may be used to condition input power, and a linear power supply may be used to power the RF circuit 1926. The power supply may be configured to operate over various ranges of appropriate input voltages.

The gateway 1900 may further include (and/or be in communication with) one or more non-transitory machine-readable storage mediums or storage devices (e.g., memory 1912), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1912, such as RAM, ROM, FLASH, or disc drive, and executed by processor(s) 1902 or DSP 1904. The gateway 1900 can also comprise software elements (e.g., located within the memory 1912), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 5 or FIG. 13, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 5 or FIG. 13. The memory 1912 may be a non-transitory machine-readable storage medium, processor-readable memory, and/or a computer-readable memory that stores the one or more computer-program products configured to cause the processor(s) 1902 to perform the functions described. In other embodiments, one or more of the functions described may be performed in hardware.

A set of these instructions and/or code might be stored on a non-transitory machine-readable storage medium, such as the memory 1912. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the gateway 1900 and/or might take the form of source and/or installable code, which, upon compilation and/or installation on the gateway 1900 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
generating, at a computing device, a prediction including a correlation between an interaction with a network device and a context, wherein the interaction is associated with a function performed by the network device;
determining confidence parameters associated with the prediction;
generating a testing outcome by testing the prediction, wherein testing includes analyzing received interaction data and contextual data, and wherein analyzing includes determining whether the interaction with the network device occurred in the context;
calculating a confidence value based on the testing outcome;
comparing the confidence value to the confidence parameters;
determining that the confidence value does not exceed at least one of the confidence parameters in response to comparing the confidence value to the confidence parameters;
transmitting a message that relates to a modification of the confidence parameters;
receiving, from a user at the computing device, input corresponding to an instruction to modify the confidence parameters;
modifying the confidence parameters based on the input;
comparing the confidence value to the modified confidence parameters;
determining that the confidence value exceeds the modified confidence parameters in response to comparing the confidence value to the modified confidence parameters;
detecting, by the computing device, the context associated with prediction;
transmitting, by the computing device and to the network device, an execution instruction associated with the function of the network device in response to detecting the context associated with the prediction; and
executing, by the network device, the function performed by the network device in response receiving the execution instruction.

2. The computer-implemented method of claim 1, wherein the confidence parameters include a threshold confidence value and a threshold number of observations, wherein the observations correspond to the context occurring.

3. The computer-implemented method of claim 2, wherein comparing the confidence value to the confidence parameters includes determining whether the confidence value has reached the threshold confidence value and determining whether the threshold number of observations has been reached.

4. The computer-implemented method of claim 1, wherein the message is transmitted as part of an initial setup process.

5. The computer-implemented method of claim 1, wherein the message is transmitted in response to determining that the confidence value has not reached a threshold confidence value.

6. The computer-implemented method of claim 1, wherein the message is transmitted in response to:
determining that the confidence value has been reached; and
determining that a threshold number of observations has not been reached.

7. The computer-implemented method of claim 1, wherein modifying the confidence parameters includes transitioning from an initial operational mode to a new operational mode.

8. The computer-implemented method of claim 1, wherein the computing device is the network device, a user device, or a cloud-based device.

9. The computer-implemented method of claim 1, wherein the message further relates to a modification of confidence parameters associated with a different prediction, wherein the different prediction includes a correlation between an interaction with a different network device and a different context.

10. A system, comprising:
a computing device comprising:
one or more processors; and
a non-transitory computer-readable storage medium containing instructions which when executed on the one or more processors, cause the one or more processors to perform operations including:
generating a prediction including a correlation between an interaction with a network device and a context, wherein the interaction is associated with a function performed by the network device;
determining confidence parameters associated with the prediction;
generating a testing outcome by testing the prediction, wherein testing includes analyzing received interaction data and contextual data, and wherein analyzing includes determining whether the interaction with the network device occurred in the context;
calculating a confidence value based on the testing outcome;
comparing the confidence value to the confidence parameters;
determining that the confidence value does not exceed at least one of the confidence parameters in response to comparing the confidence value to the confidence parameters;
transmitting a message that relates to a modification of the confidence parameters;
receiving input corresponding to an instruction to modify the confidence parameters;

modifying the confidence parameters based on the input;

comparing the confidence value to the modified confidence parameters;

determining that the confidence value exceeds the modified confidence parameters in response to comparing the confidence value to the modified confidence parameters;

detecting the context associated with prediction; and transmitting, to the network device, an execution instruction, the execution instruction configured to direct the network device to execute the function of the network device;

the network device comprising:

one or more processors; and a non-transitory computer-readable storage medium containing instructions which when executed on the one or more processors, cause the one or more processors to perform operations including:

receiving, from the computing device, the execution instruction associated the function of the network device; and executing the function performed by the network device in response receiving the execution instruction.

11. The system of claim 10, wherein the confidence parameters include a threshold confidence value and a threshold number of observations, wherein the observations correspond to the context occurring.

12. The system of claim 11, wherein comparing the confidence value to the confidence parameters includes determining whether the confidence value has reached the threshold confidence value and determining whether the threshold number of observations has been reached.

13. The system of claim 10, wherein the message is transmitted as part of an initial setup process.

14. The system of claim 10, wherein the message is transmitted in response to determining that the confidence value has not reached a threshold confidence value.

15. The system of claim 10, wherein the message is transmitted in response to:

determining that the confidence value has been reached; and determining that a threshold number of observations has not been reached.

16. The system of claim 10, wherein modifying the confidence parameters includes transitioning from an initial operational mode to a new operational mode.

17. The system of claim 10, wherein the computing device is the network device, a user device, or a cloud-based device.

18. The system of claim 10, wherein the message further relates to a modification of confidence parameters associated with a different prediction, wherein the different prediction includes a correlation between an interaction with a different network device and a different context.

19. A non-transitory machine-readable storage medium including instructions that, when execute on one or more processors, cause the one or more processors to perform operations including:

generating a prediction including a correlation between an interaction with a network device and a context, wherein the interaction is associated with a function performed by the network device;

determining confidence parameters associated with the prediction;

generating a testing outcome by testing the prediction, wherein testing includes analyzing received interaction data and contextual data, and wherein analyzing includes determining whether the interaction with the network device occurred in the context;

calculating a confidence value based on the testing outcome;

comparing the confidence value to the confidence parameters;

transmitting a first message that relates to a modification of the confidence parameters;

receiving input corresponding to an instruction to modify the confidence parameters;

modifying the confidence parameters;

calculating an updated confidence value based the testing outcome;

comparing the updated confidence value to the modified confidence parameters;

determining that the updated confidence value exceeds the confidence parameters in response to comparing the updated confidence value to the modified confidence parameters;

transmitting a second message, wherein the second message includes an automation request corresponding to the function performed by the network device;

receiving input indicating approval to automate the function of the network device;

detecting the context associated with the prediction; and transmitting, to the network device, an execution instruction, wherein the network device, upon receiving the execution instruction, executes the function of the network device.

20. The non-transitory machine-readable storage medium of claim 19, wherein the confidence parameters include a threshold confidence value and a threshold number of observations, wherein the observations correspond to the context occurring.

21. The non-transitory machine-readable storage medium of claim 20, wherein comparing the confidence value to the confidence parameters includes determining whether the confidence value has reached the threshold confidence value and determining whether the threshold number of observations has been reached.

22. The non-transitory machine-readable storage medium of claim 19, wherein the first message is transmitted as part of an initial setup process.

23. The non-transitory machine-readable storage medium of claim 19, wherein the first message is transmitted in response to determining that the confidence value has not reached a threshold confidence value.

24. The non-transitory machine-readable storage medium of claim 19, wherein the first message is transmitted in response to:

determining that the confidence value has been reached; and determining that a threshold number of observations has not been reached.

25. The non-transitory machine-readable storage medium of claim 19, wherein modifying the confidence parameters includes transitioning from an initial operational mode to a new operational mode.

26. The non-transitory machine-readable storage medium of claim 19, wherein the one or more processors are included within the network device, a user device, or a cloud-based device.

27. The non-transitory machine-readable storage medium of claim 19, wherein the first message further relates to a modification of confidence parameters associated with a different prediction, wherein the different prediction includes a correlation between an interaction with a different network device and a different context.

* * * * *